(12) United States Patent
McClure et al.

(10) Patent No.: US 6,772,248 B1
(45) Date of Patent: Aug. 3, 2004

(54) PROTOCOL ADAPTER FOR IN-VEHICLE NETWORKS

(75) Inventors: Robert McClure, Danville, IN (US); David Such, Greenwood, IN (US)

(73) Assignee: Dearborn Group, Inc., Farmington Hills, MI (US)

( * ) Notice: Subject to any disclaimer, the term of this patent is extended or adjusted under 35 U.S.C. 154(b) by 0 days.

(21) Appl. No.: 09/532,718

(22) Filed: Mar. 22, 2000

Related U.S. Application Data

(60) Provisional application No. 60/126,588, filed on Mar. 26, 1999.

(51) Int. Cl.[7] .............................................. G06F 13/12
(52) U.S. Cl. .............................. 710/72; 710/62; 701/24; 701/29
(58) Field of Search ....................... 710/72, 62; 701/24, 701/29, 33

(56) References Cited

U.S. PATENT DOCUMENTS

| | | | | |
|---|---|---|---|---|
| 5,541,840 A | * | 7/1996 | Gurne et al. ................... | 701/33 |
| 5,870,573 A | * | 2/1999 | Johnson ....................... | 710/107 |
| 5,896,569 A | * | 4/1999 | Butler et al. ................. | 455/423 |
| 6,122,684 A | * | 9/2000 | Sakura ........................ | 358/450 |
| 6,195,359 B1 | * | 2/2001 | Eng et al. .................... | 370/401 |

* cited by examiner

Primary Examiner—Jeffrey Gaffin
Assistant Examiner—Harold Kim
(74) Attorney, Agent, or Firm—Warn, Hoffmann, Miller & LaLone, P.C.

(57) ABSTRACT

An apparatus for in-vehicle electronic control module (ECM) development in which network protocol control parameters are varied. The apparatus includes an adapter, which consists of a microprocessor subassembly and an interface subassembly, and computer based (client) software with two parts: the host communication level and the API (DLL). The apparatus provides a "pass-through" interface such that various compliant applications from various developers can use a common adapter. The apparatus provides a "pass-through" interface such that all compliant adapters from various developers can use any of the unique developer applications. This makes all compliant software applications and hardware interface adapters interchangeable. The improved protocol adapter is designed to perform the following functions: ECM emulation, analysis of network message loading, simulation of message traffic loading of an in-vehicle network, inventory management, ECM code testing, a gateway between networks, and to provide vehicle maintenance status checks.

2 Claims, 32 Drawing Sheets

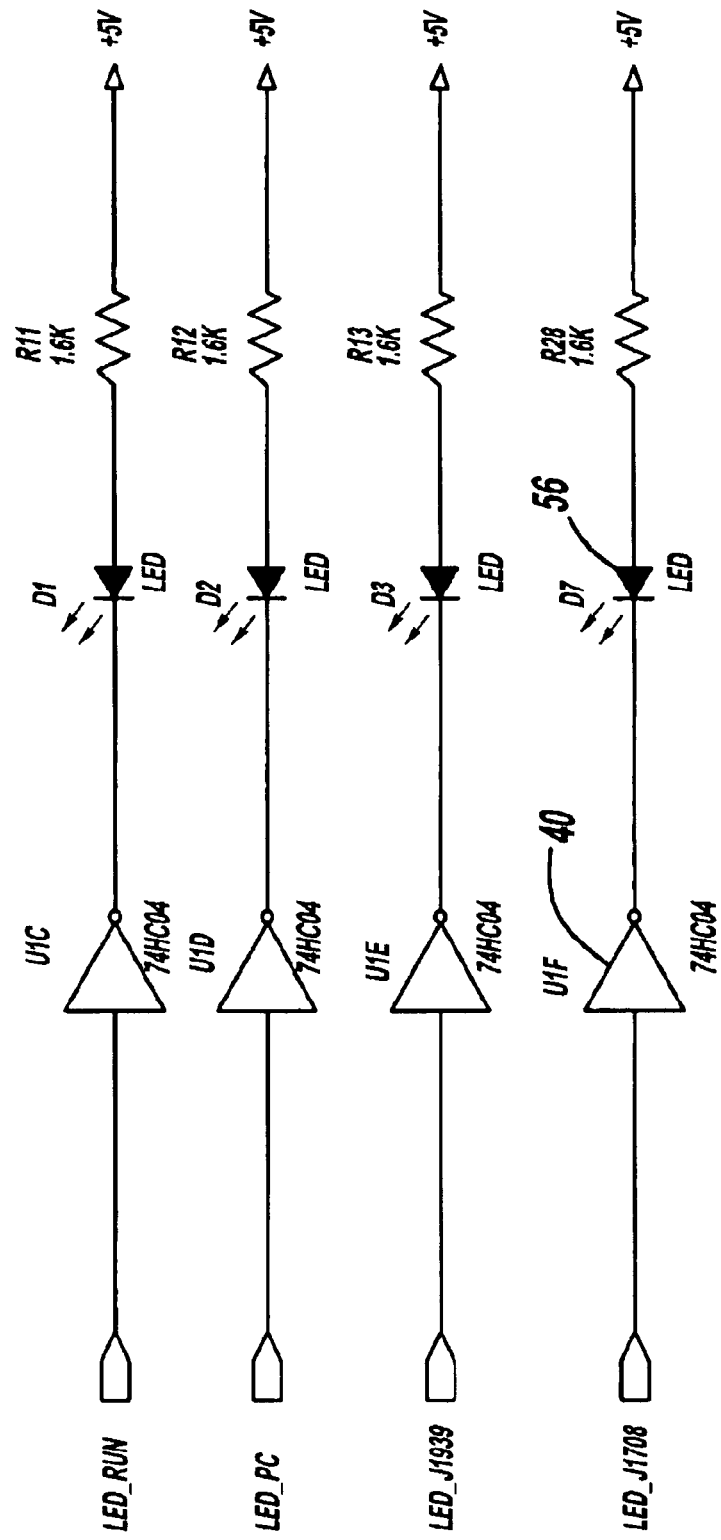
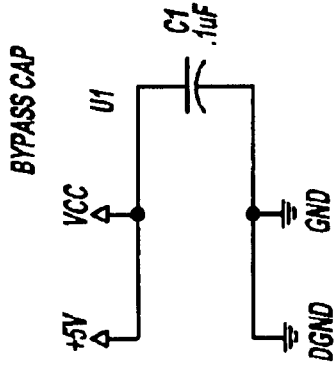
FIG-15

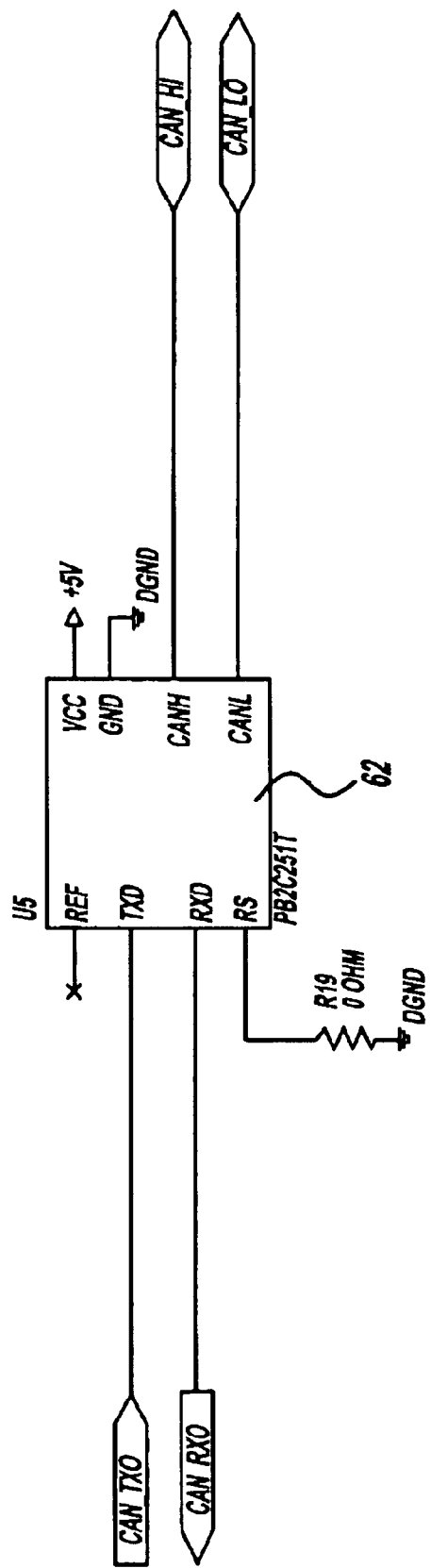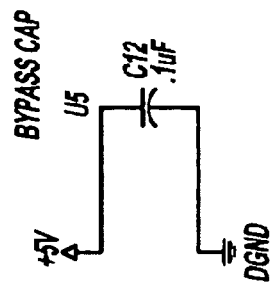
FIG-21

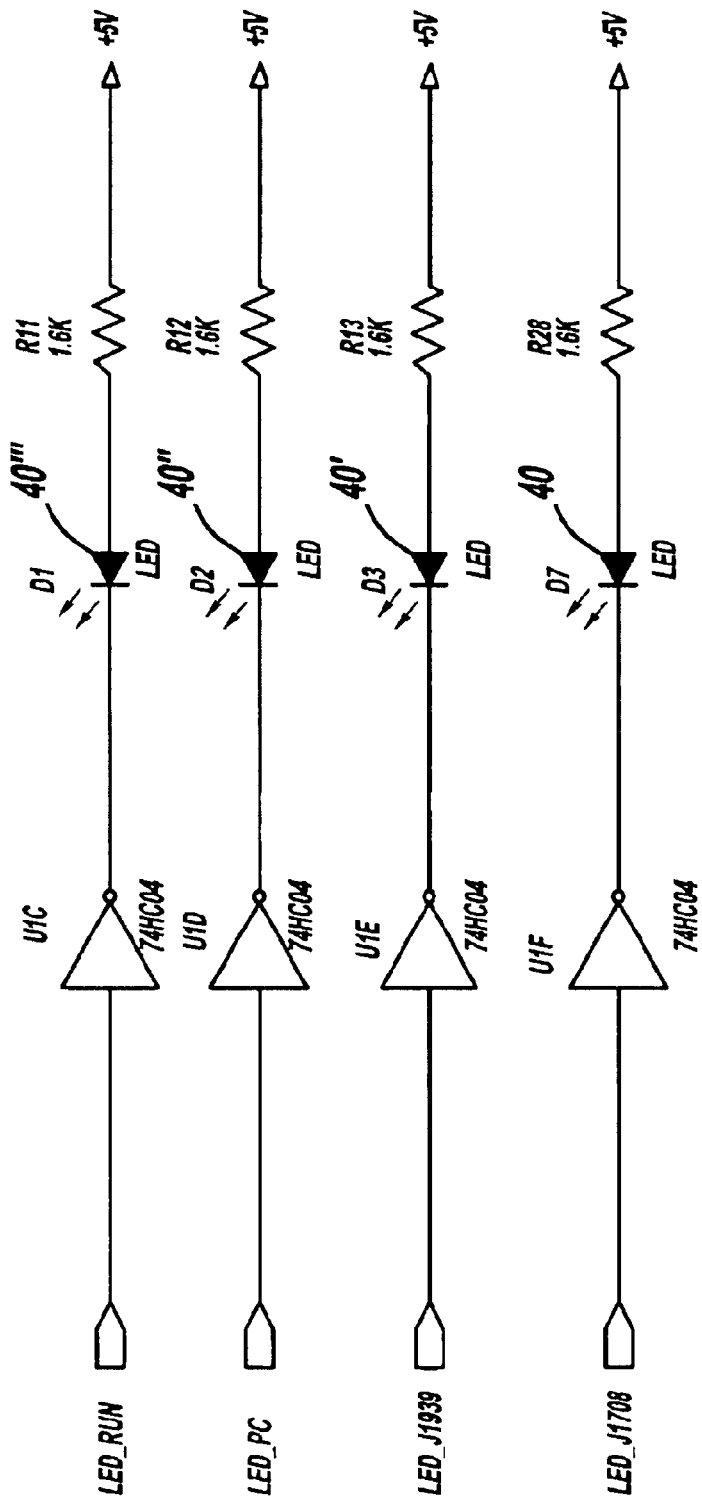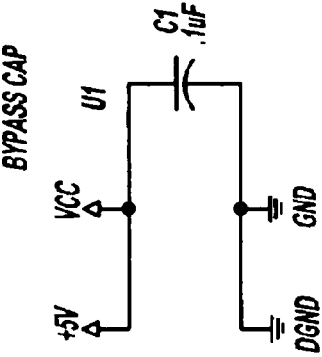
FIG-25

PROTOCOL ADAPTER FOR IN-VEHICLE NETWORKS

REFERENCE TO RELATED APPLICATION

This application is based on provisional patent application 60/126,588, filed Mar. 26, 1999.

BACKGROUND OF THE INVENTION

The field of the invention pertains to in-vehicle networks for diagnostics, analysis and monitoring. The networks integrate with PC gateways for data acquisition, computer-based measurement, and automation systems with in-vehicle communication. However, in the past, when hardware components were upgraded, existing software could become non-compatible with the upgraded hardware. Manufacturers of various tools attempted to remedy these compatibility problems by using a box to talk to multiple data links. This was not very satisfactory and a better solution to this problem was needed.

SUMMARY OF THE INVENTION

It is therefore an object of this invention to provide an improved protocol adapter for in-vehicle use.

It is also an object of this invention to provide such an improved protocol adapter which has reflashing for upgrading of firmware.

It is a further object of this invention to provide such an improved protocol adapter which has visual indicators for indicating the program being executed by the protocol adapter.

It is a further object of this invention to provide such an improved protocol adapter which has LED's for visual indicators.

It is a further object of this invention to provide such an improved protocol adapter which has a pass-through mode to emulate other protocol adapters.

It is a further object of this invention to provide such pass through mode which has a voltage translator.

It is a further object of this invention to provide such an improved protocol adapter which connects circuitry and programs wirelessly.

The protocol adapter of the invention is a diagnostic tool that can bridge a lap-top or bench-top or other computer to a vehicle network. It is advantageous for research and development applications, end of line testing, and design and production applications such as quality control, life-cycle testing, and burn-in applications.

The protocol adapter of the invention solves the above-identified problem by operating as a translator box that works with a variety of software packages. Thus, the invention is operable with existing diagnostic software packages.

A special pass-through mode allows users to continue utilizing yesterday's in-house software, while communicating with today's hardware. Older software packages such as RP1202 and RP1210 can still be employed. This feature allows users to replace aging hardware with an interface that can support existing software. Consequently, users can replace old hardware with the invention and yet maintain compatibility with their original software.

The earlier protocol adapter supported SAE J1708, SAER J1939, and Controller-Area (CAN) networks. The earlier adapter has a voltage converter mode that supports RS-232-to-RS-485 voltage conversion. The normal RS-232 port allows direct access to the J1708/ RS-485 link. The improved protocol adapter supports the listed prior protocol adapter features, including a library (DLL/VxD for Windows CVI) and on-board flash for field upgrades. The improved protocol adapter also employs a pass-through mode which supports communication with "old" software packages (e.g. RP1201 and RP1210).

The improved protocol adapter can be used wirelessly to perform the following functions: ECU fault code interrogation; communication with a remote network; vehicle maintenance status checks or trip/performance data downloads; and improved asset control, logistics and inventory management, diagnostic support, and maintenance/scheduling.

An ISA version of the improved protocol adapter is a half slot card that supports CAN (J1939 and DeviceNet), SAE J1850, and GM UART protocols.

The invention has reflashing that allows the protocol adapter to be updated with new firmware in the field. This is accomplished by U5, U1, U8 and U4. U5, (micro) processes a command sent to the protocol adapter by the host. It then copies the reflash instructions set (loader program) into RAM (U) and then transfers control to that program (loader). The loader program responds to the commands from the host which allows the host computer to then clear and reprogram the Flash (U4). Once the reproming is complete control is passed back to the flash program.

The invention has status lights that allow the operator to determine what program is being executed by protocol adapter embedded micro. U5 (micro) will flash the LEDs on the I/O board in a predefined manner at power up to indicate what version of firmware is being executed.

The invention has a pass through feature (voltage translator)/smart mode that allows this version of the protocol adapter to emulate older boxes. In this mode of operation, the U5 (micro) delivers data directly from the J1708 Transceiver (UX) to the RS232 transceiver (UX) and monitors the data to provide J1708 defined timing signals on any or all of the RS232 hardware handshake lines.

The invention has RP1202 and RP1210, J1708 and J1939, J1939 Transport Layer, Real Time Clock, Standard COMM port connection, 7–32 Volt supply and is CE compliant.

Advantages of the invention are as follows. Bank switching in that the memory is swapped in and out of the processor's memory map to allow multiple programs to run. File upgrade capability in that non-volatile memory can be reprogrammed in the field to allow new software features to added in the field. Multiple date links can be supported at the same time. Firmware and hardware version numbers are available to the host to allow the host to determine current capabilities. The manufacturer's name is embedded in flash to allow value added retailers (VAR's) to embed their own names. Proprietary software may be burned into flash to allow the locking of VAR software. The device is capable of receiving and transmitting asynchronously of host processor to allow broadcast on transmit and filter on receive. The device has a programmable multi-function to support datalink communications. The device also has a built in remote access memory to allow the host to consolidate message date, that is a "scratch pad".

For a more complete understanding of the present invention, reference is made to the following detailed description when read with in conjunction with the accompanying drawings wherein like reference characters refer to like elements throughout the several views, in which:

BRIEF DESCRIPTION OF THE DRAWINGS

FIG. 15 illustrates LED Indicators;
FIG. 21 illustrates CAN Transceiver;
FIG. 25 illustrates LED Indicators.

DESCRIPTION OF THE PREFERRED EMBODIMENTS

Figure 1:
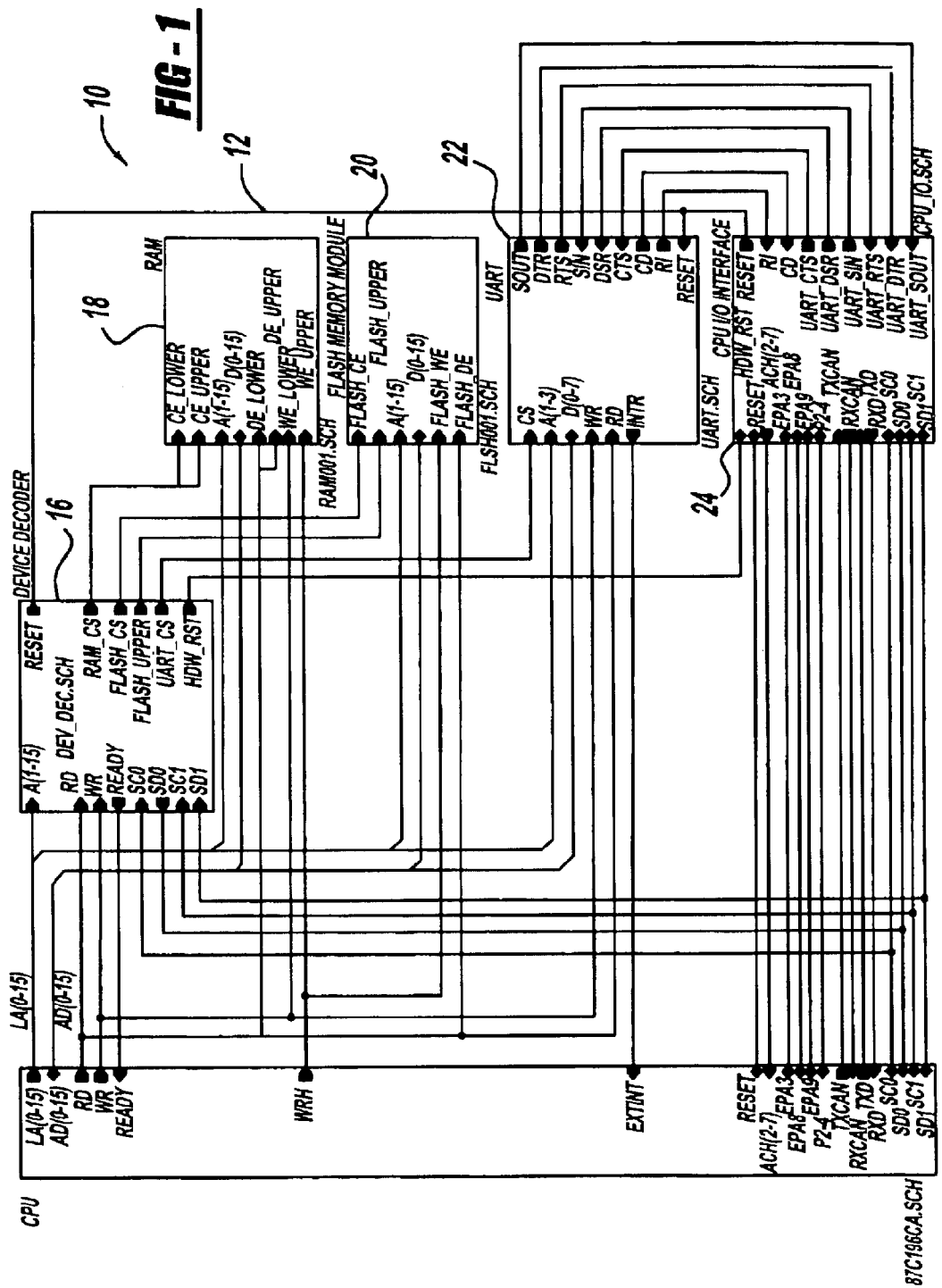
FIG. 1 illustrates inline CPU board.
Figure 2:
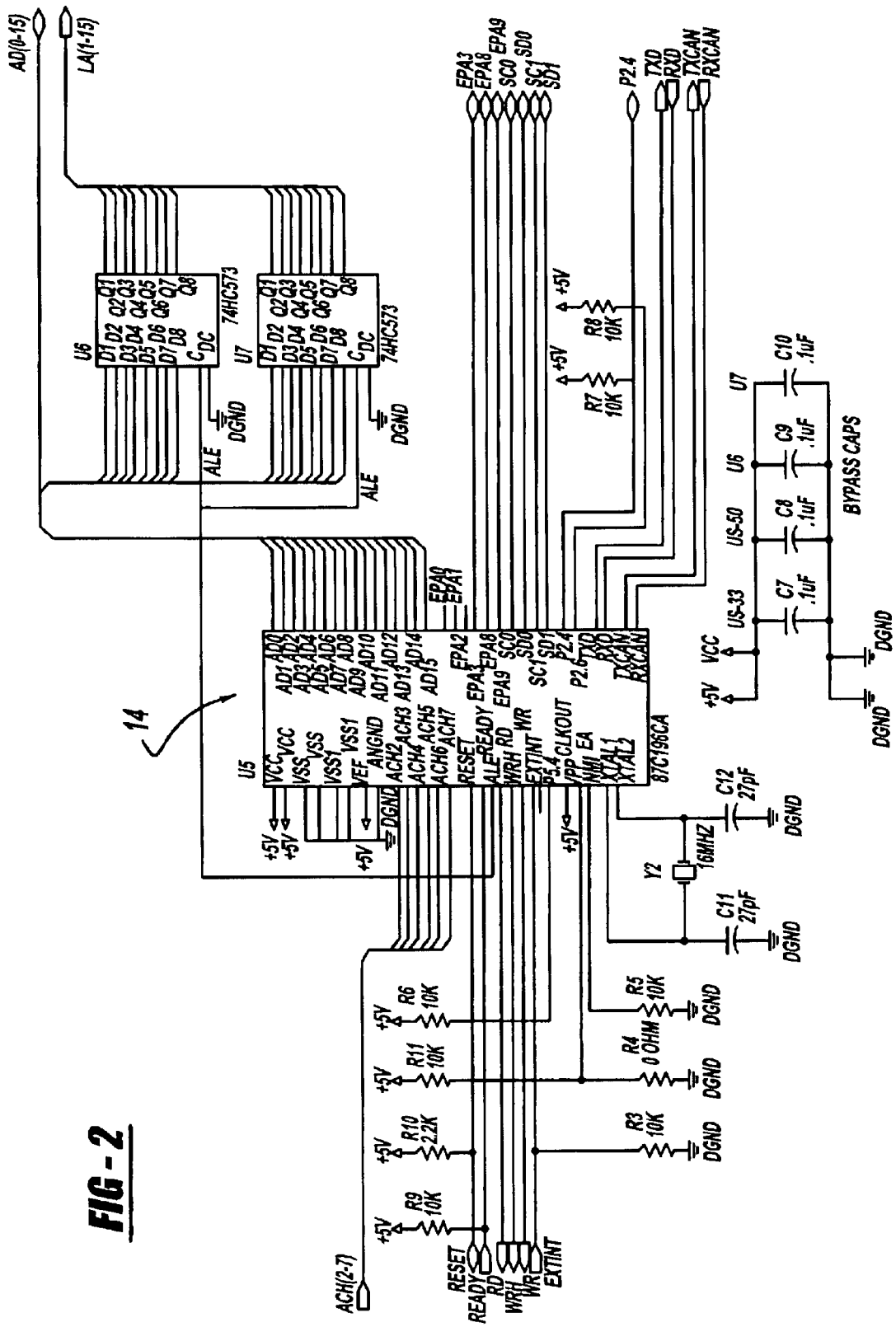
FIG. 2 illustrates Central Processing Unit.
Figure 3:
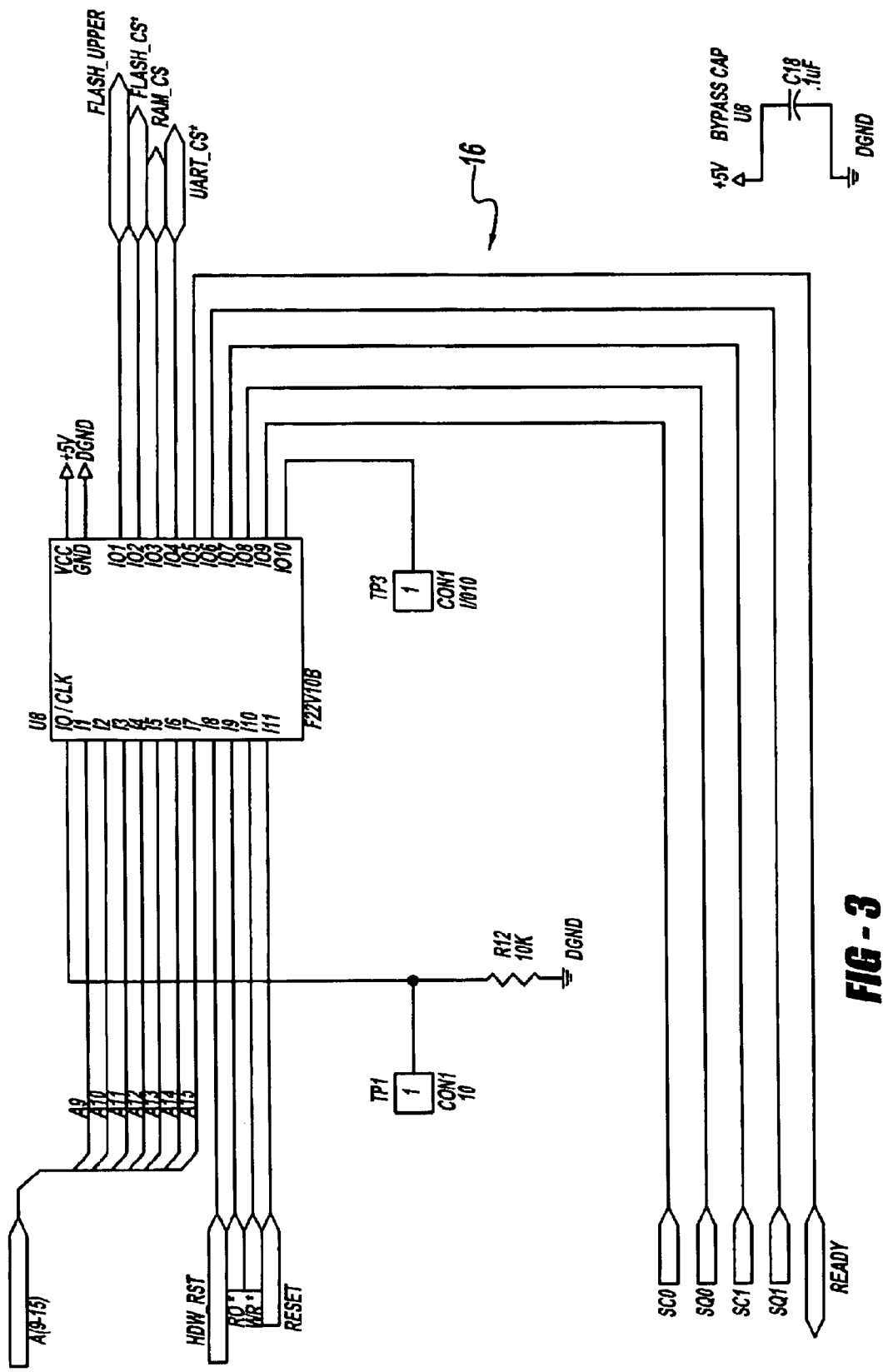
FIG. 3 illustrates Device Decoder.
Figure 4:
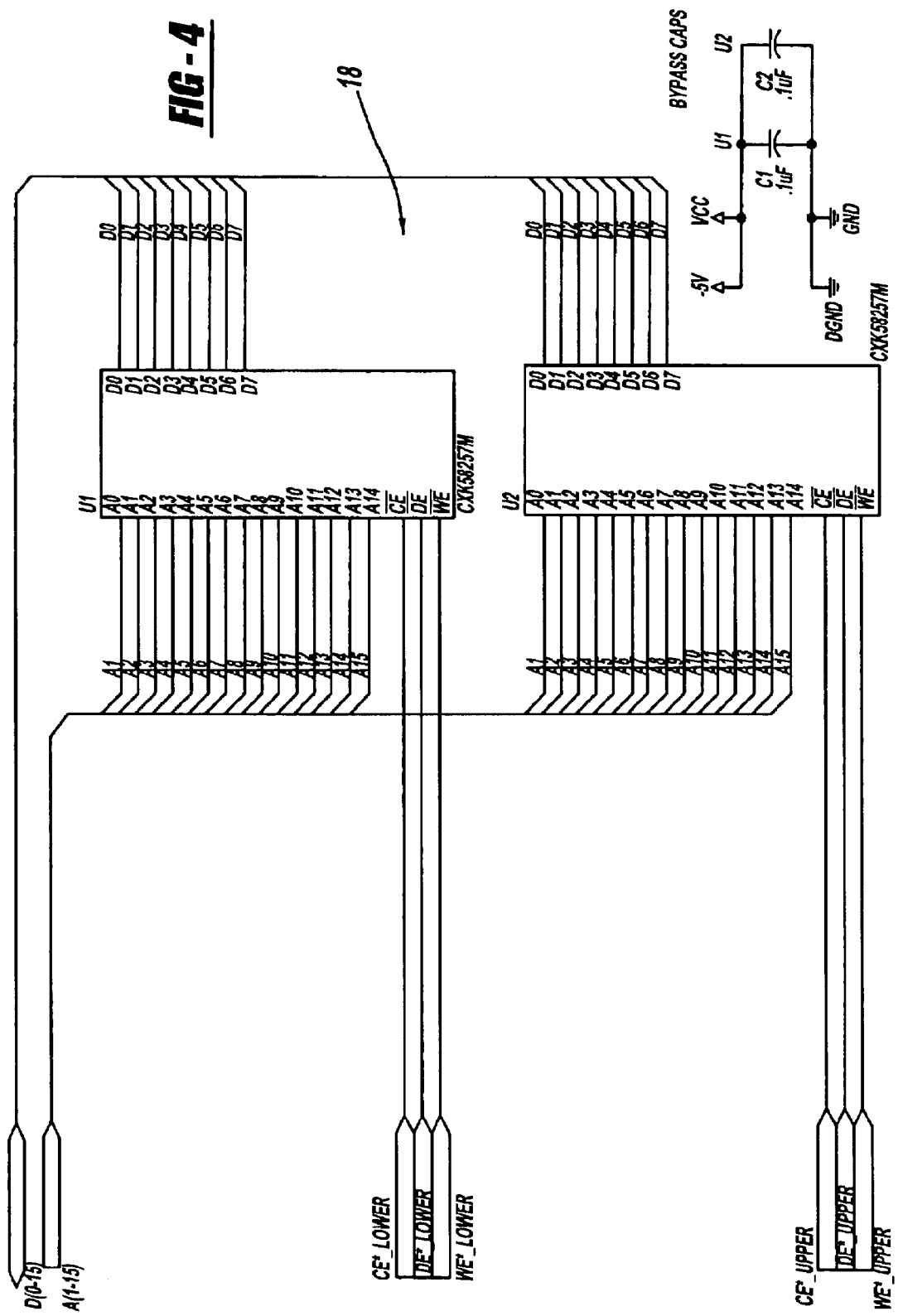
FIG. 4 illustrates Static RAM Module.
Figure 5:
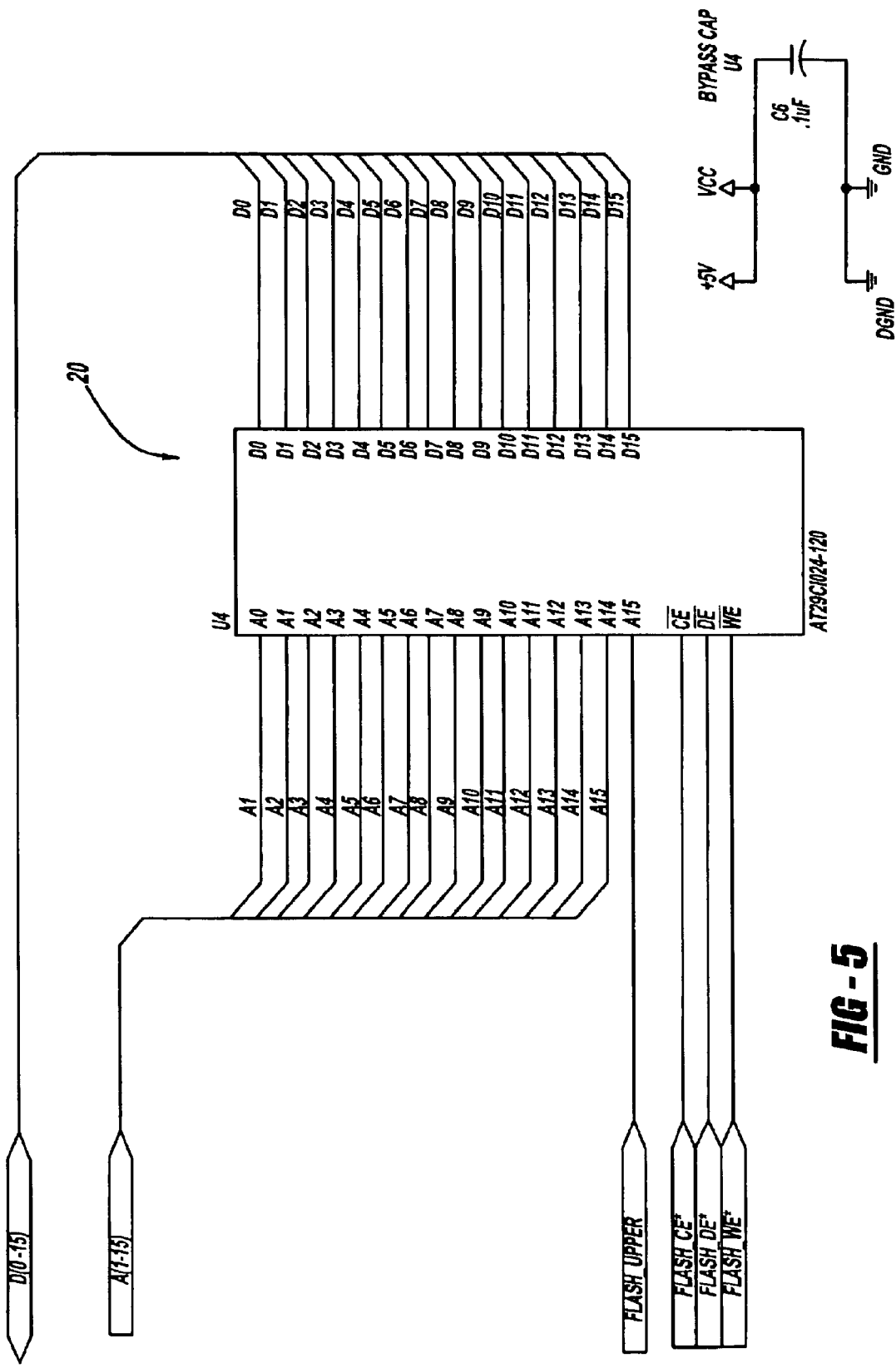
FIG. 5 illustrates Flash Memory Module.
Figure 6:
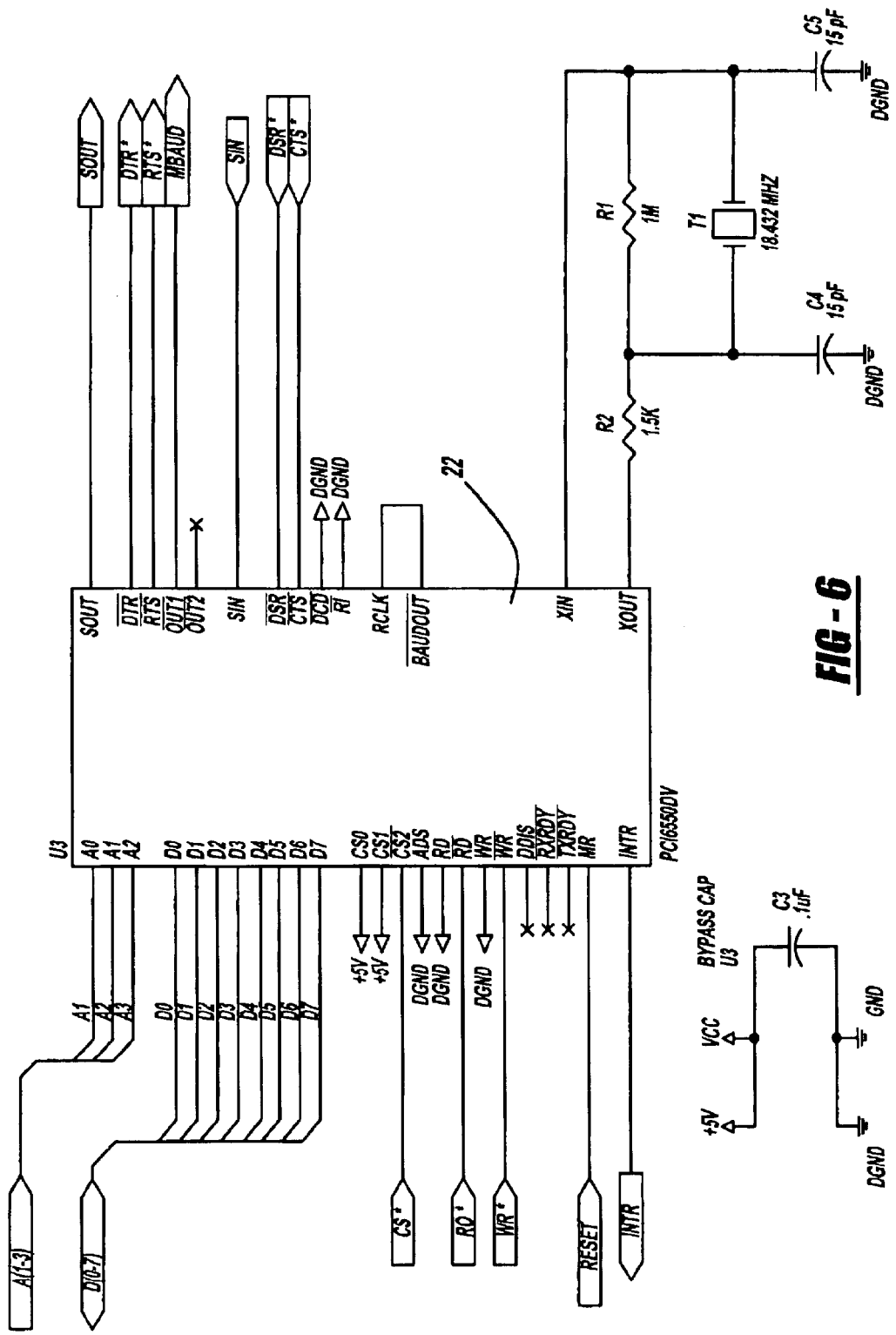
FIG. 6 illustrates UART.
Figure 7:
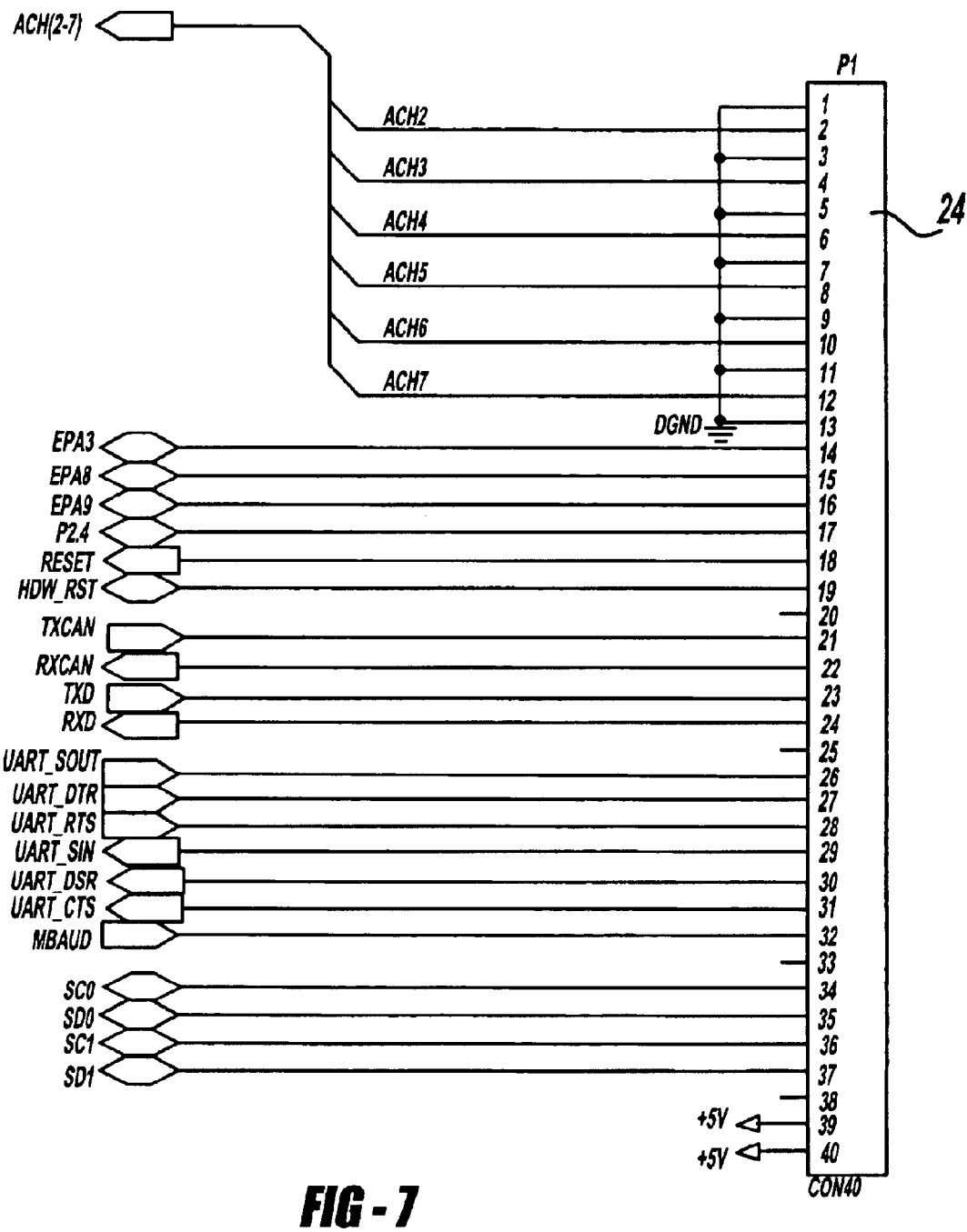
FIG. 7 illustrates CPU I/O Interface Connectors.
Figure 8:
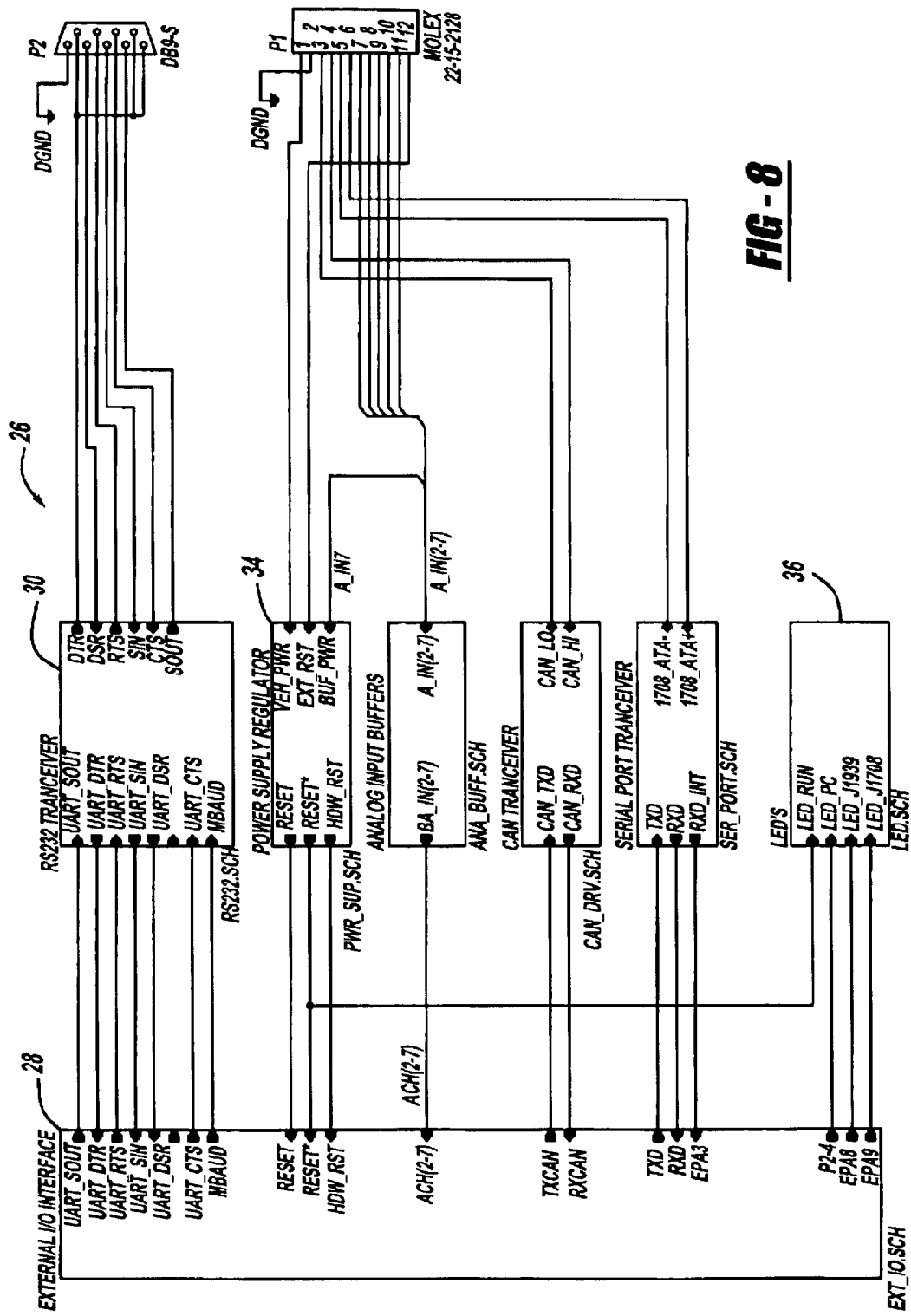
FIG. 8 illustrates Inline I/O Board.
Figure 9:
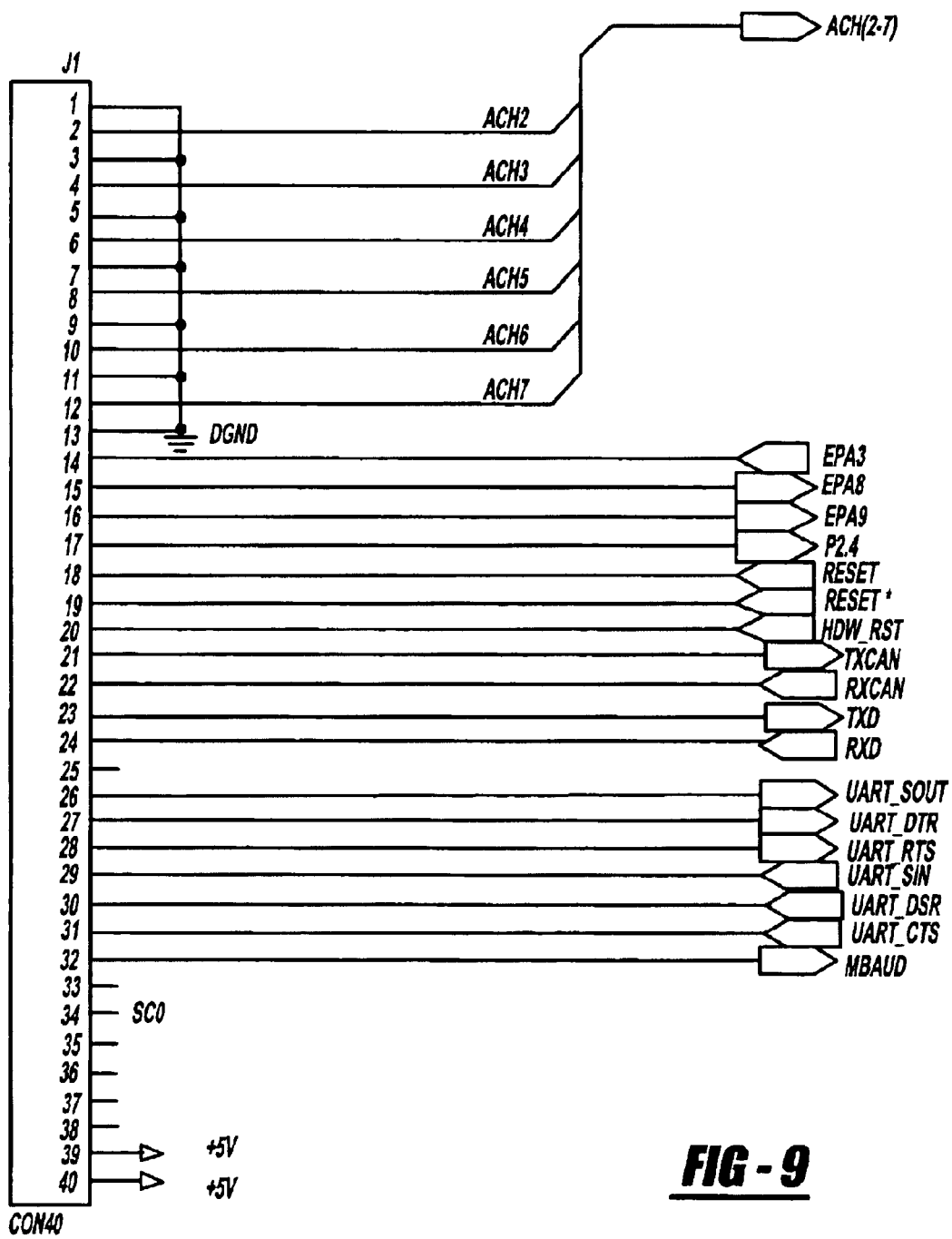
FIG. 9 illustrates a CPU I/O Interface Connectors.

Now turning to the drawings, for reference purposes, the circuits of a protocol adapter 10 are thereshown in FIGS. 1 through 17. The circuitry of the inline CPU board 12 is depicted in FIG. 1, while the Central Processing Unit 14 is depicted in FIG. 2. The inline CPU board 12 employs a device decoder 16, a static RAM module 18, a flash memory module 20, a UART 22, and CPU I/O Interface Connectors 24. The device decoder 16, the static RAM module 18, the flash memory module 20, UART 22, the CPU I/O Interface Connectors 24 are shown respectively in greater detail in FIGS. 3–7.

Figure 10:
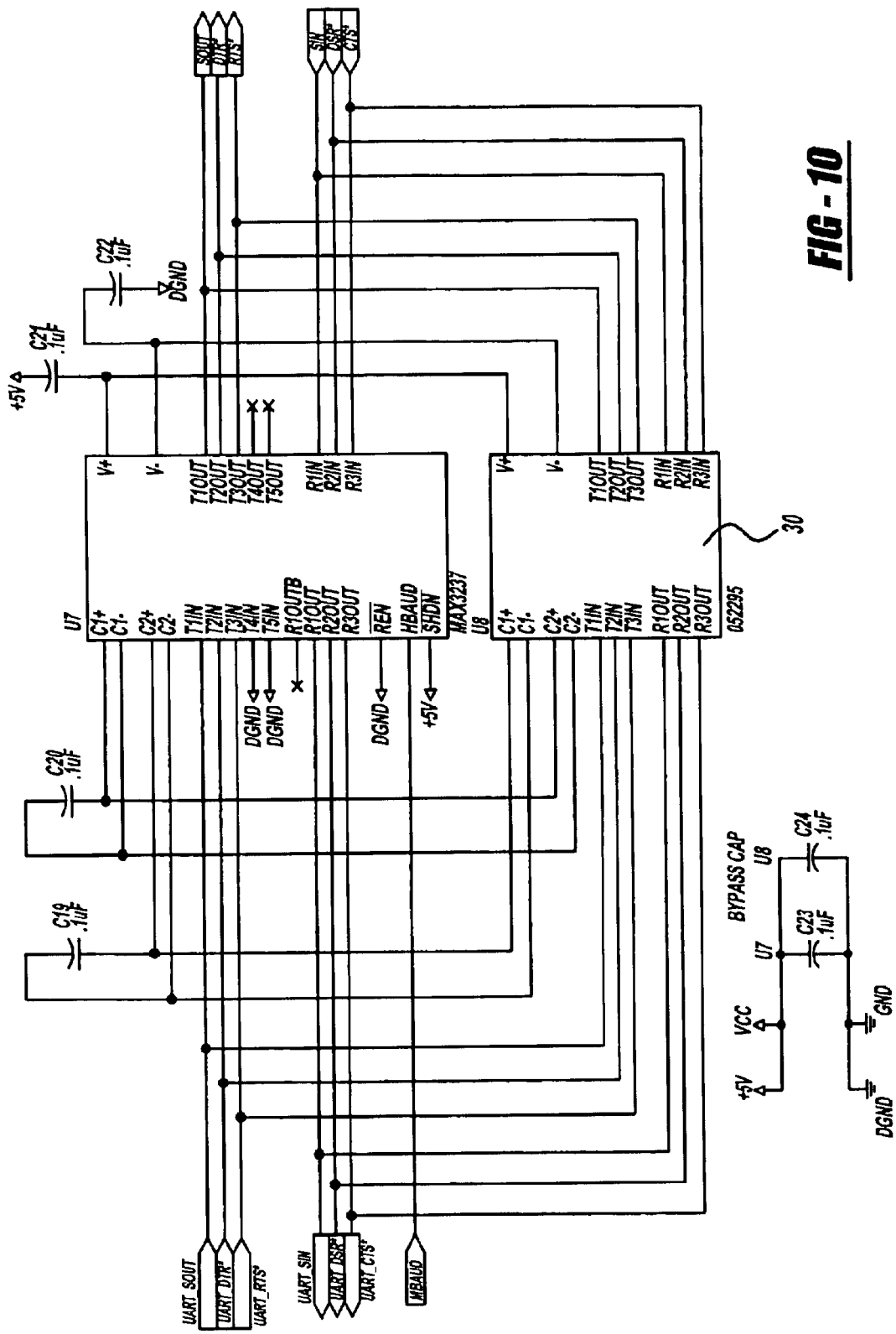
FIG. 10 illustrates RS-232 Transceiver.
Figure 11:
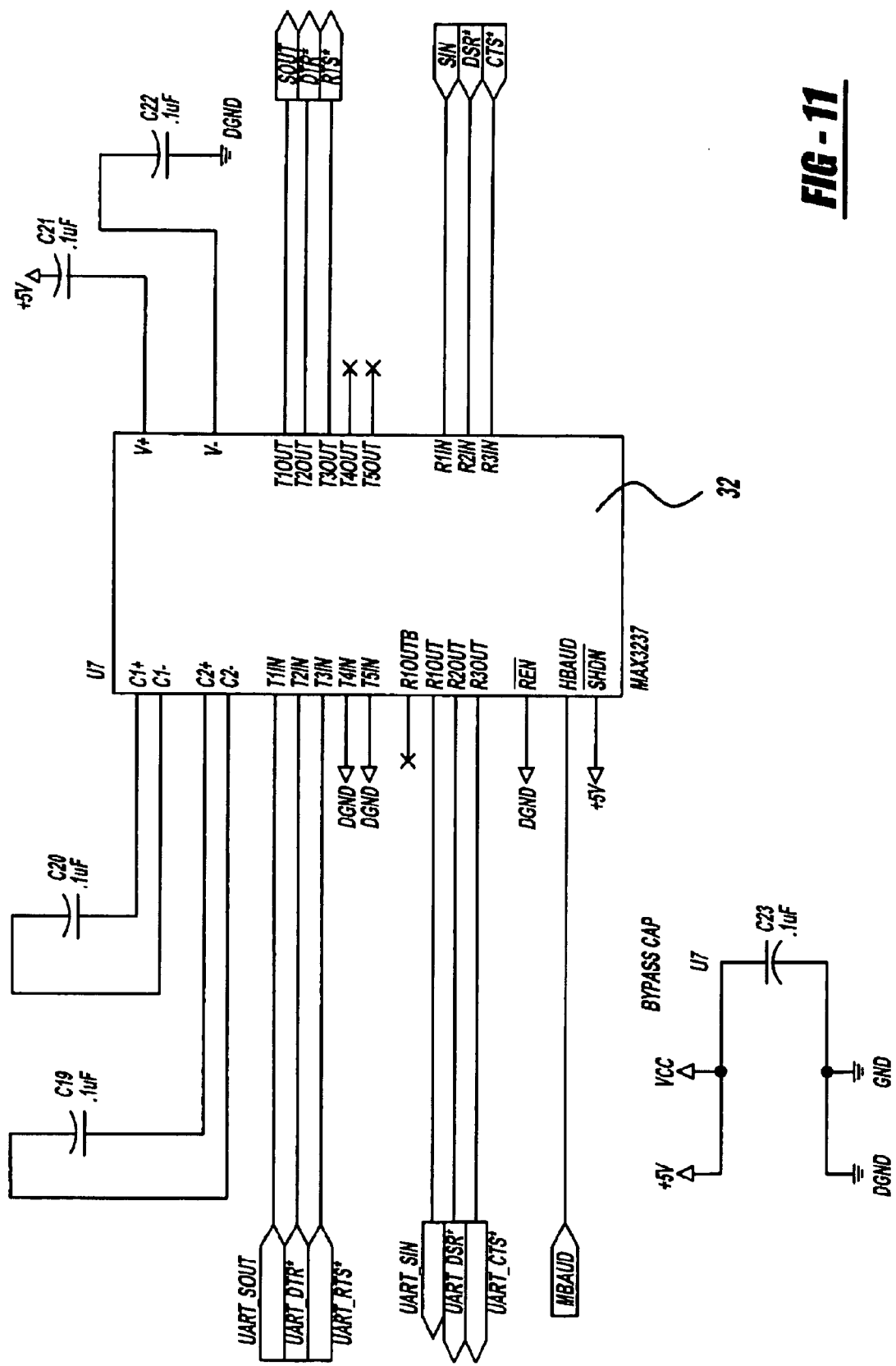
FIG. 11 illustrates RS-232 Transceiver.
Figure 12:
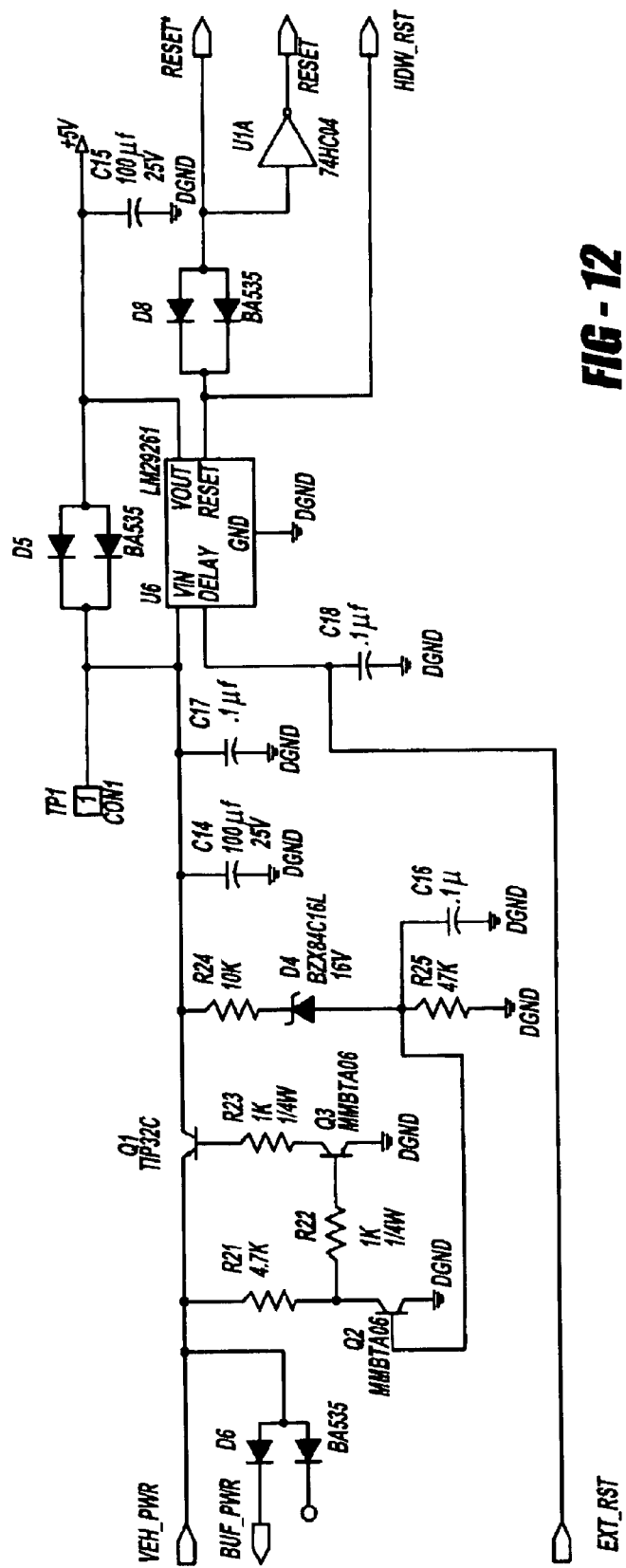
FIG. 12 illustrates Power Supply Regulator.

The Inline I/O Board 26 (FIG. 8) employs the External I/O interface 28 (shown in more detail in FIG. 10) with the RS232 Transceivers 30, 32 as shown in FIGS. 10 and 11, while the Power Supply Regulator 34 is depicted in FIG. 12.

Figure 13:
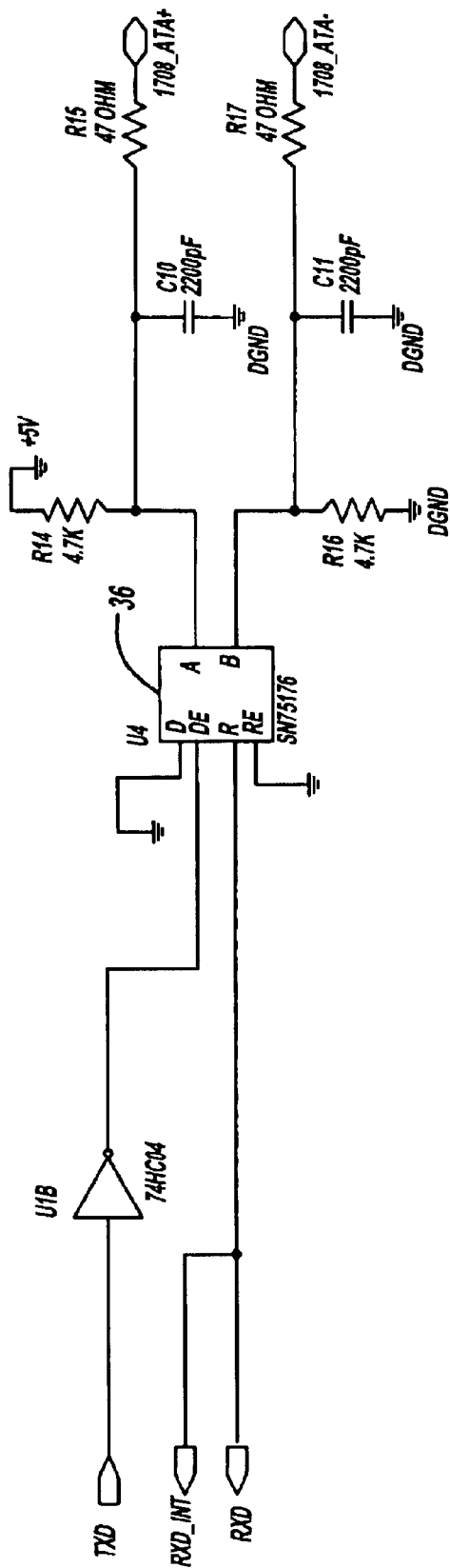
FIG. 13 illustrates 1708 Transceiver.
Figure 14:
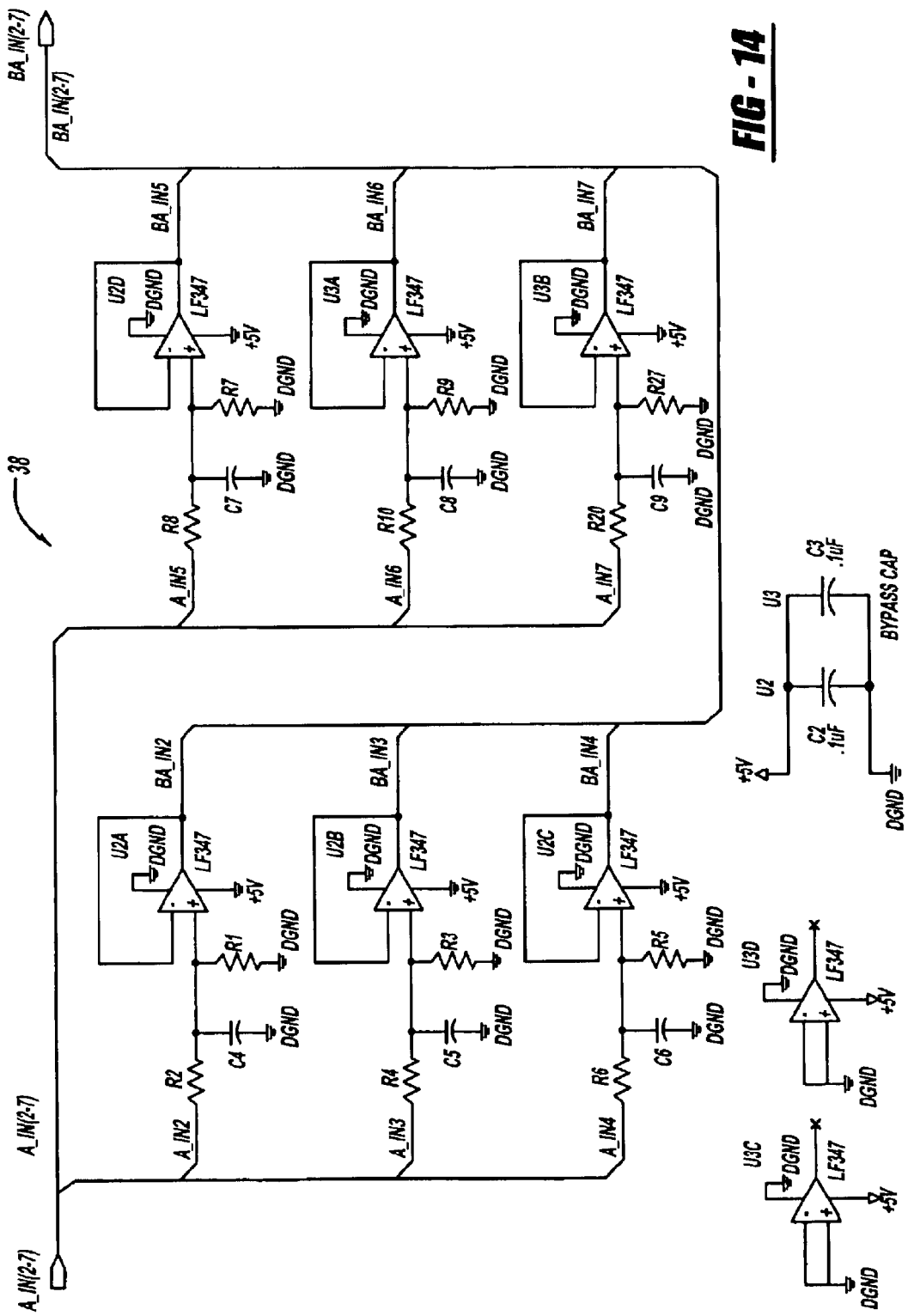
FIG. 14 illustrates Analog Input Buffers.
Figure 16:
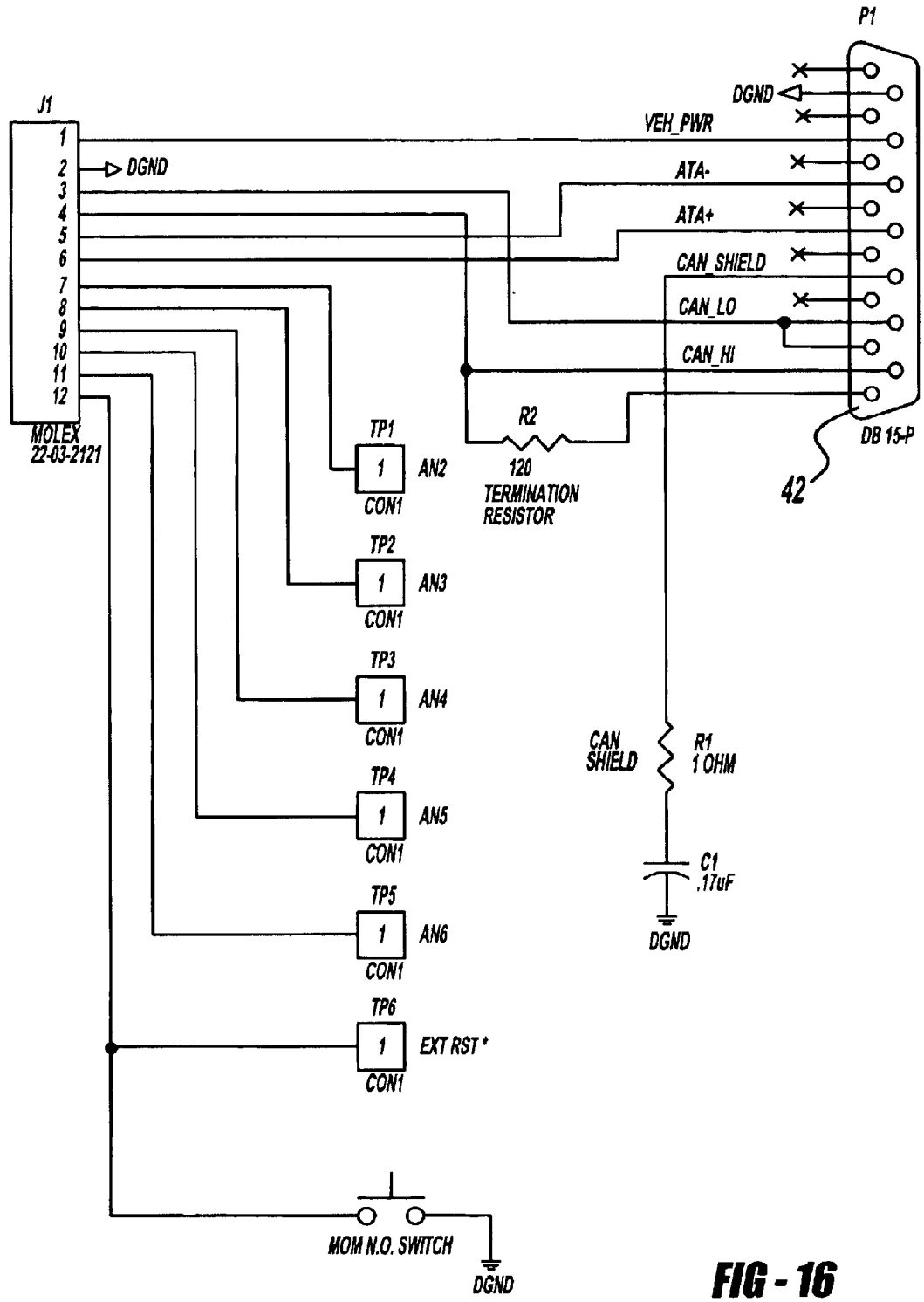
FIG. 16 illustrates Inline DPA Interface Connector.
Figure 17:
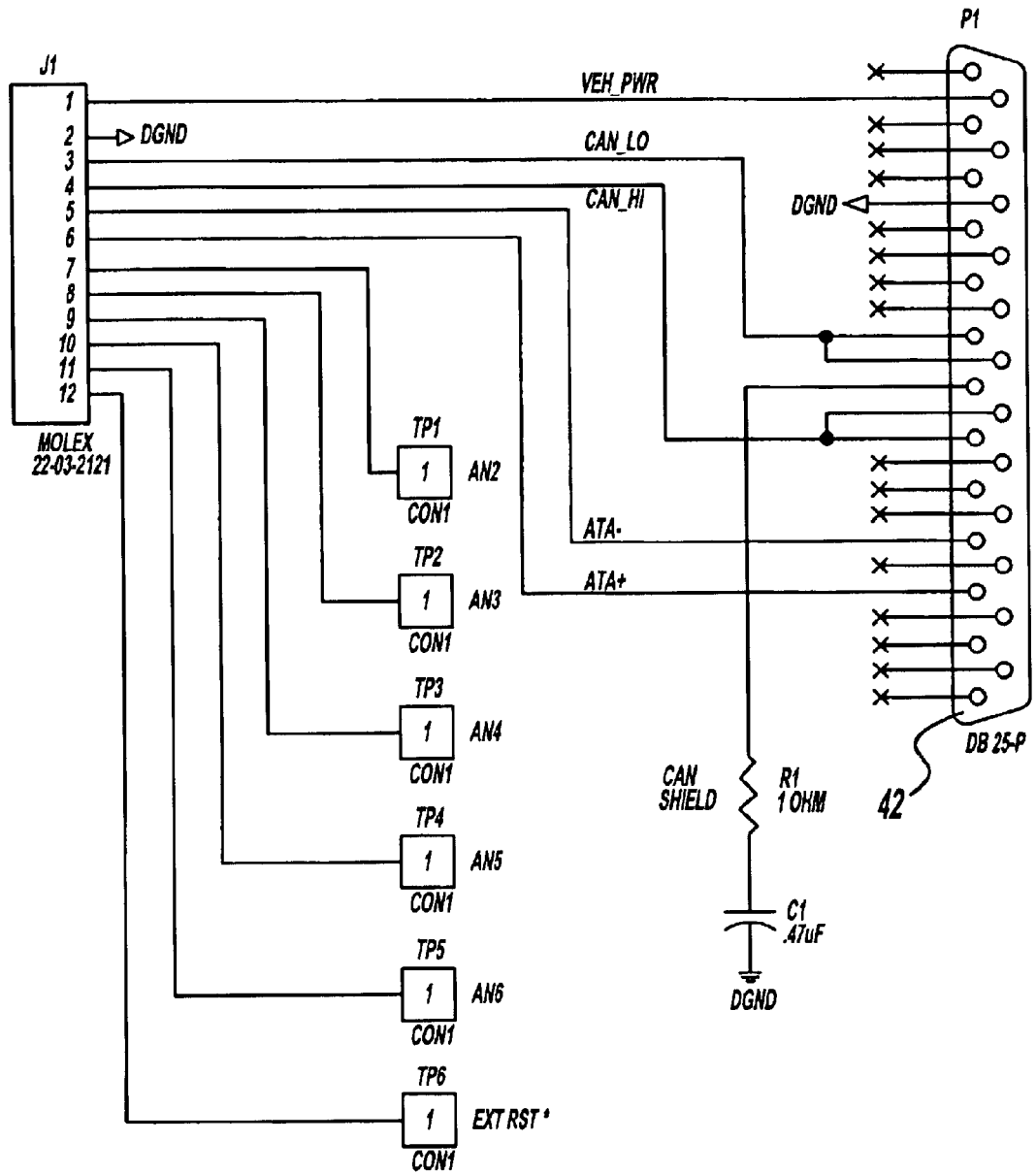
FIG. 17 illustrates Inline DPA Interface Connector.

The 1708 Transceiver 36 is shown in FIG. 13 with the Analog Input Buffers 38 shown in FIG. 14. LED Indicators 40 are depicted in FIG. 15. An Inline DPA Interface Connector 42 is shown in FIG. 16 with another Inline DPA Interface Connector shown in FIG. 17.

Figure 18:
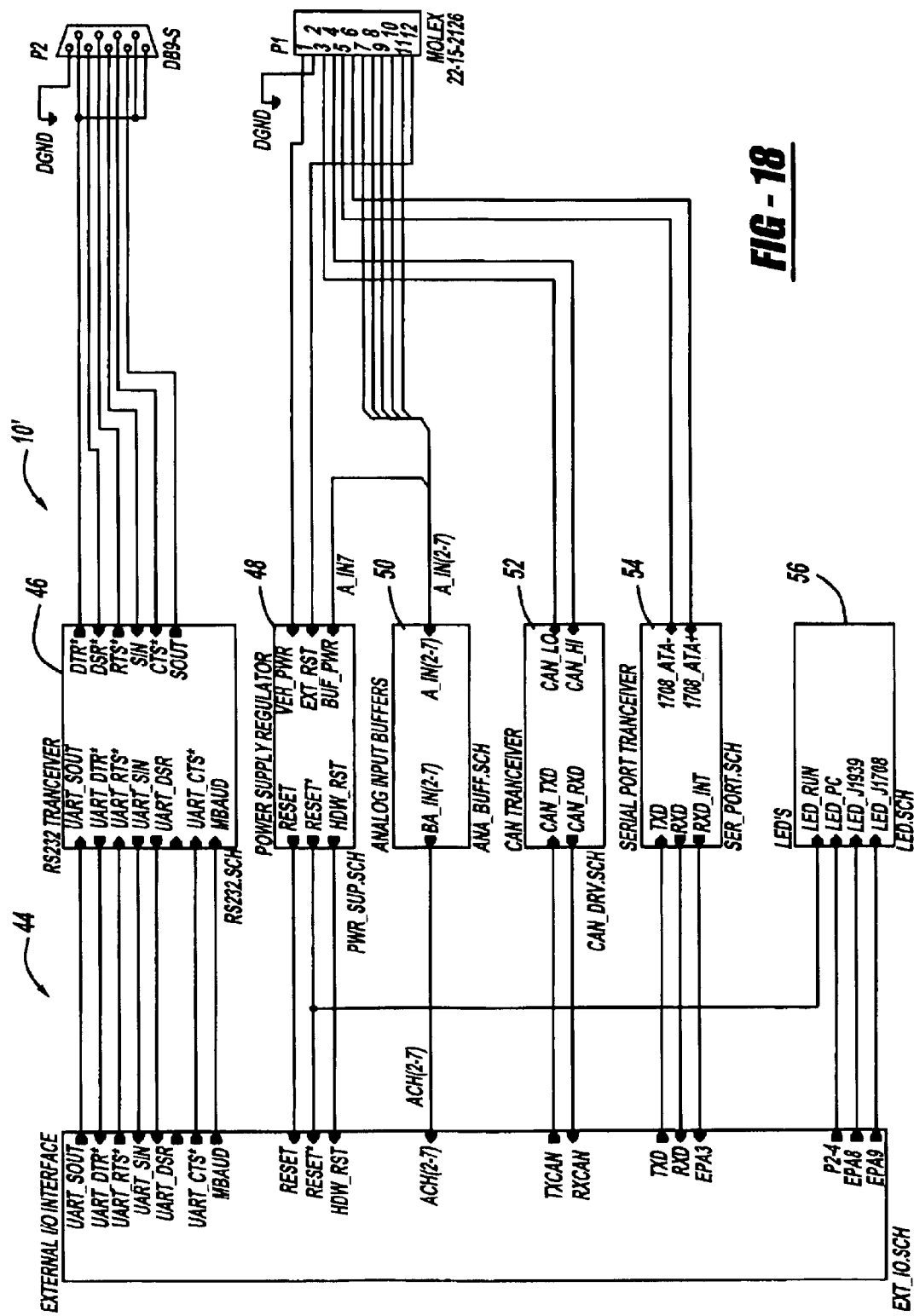
FIG. 18 illustrates DPA I/O Board.
Figure 19:
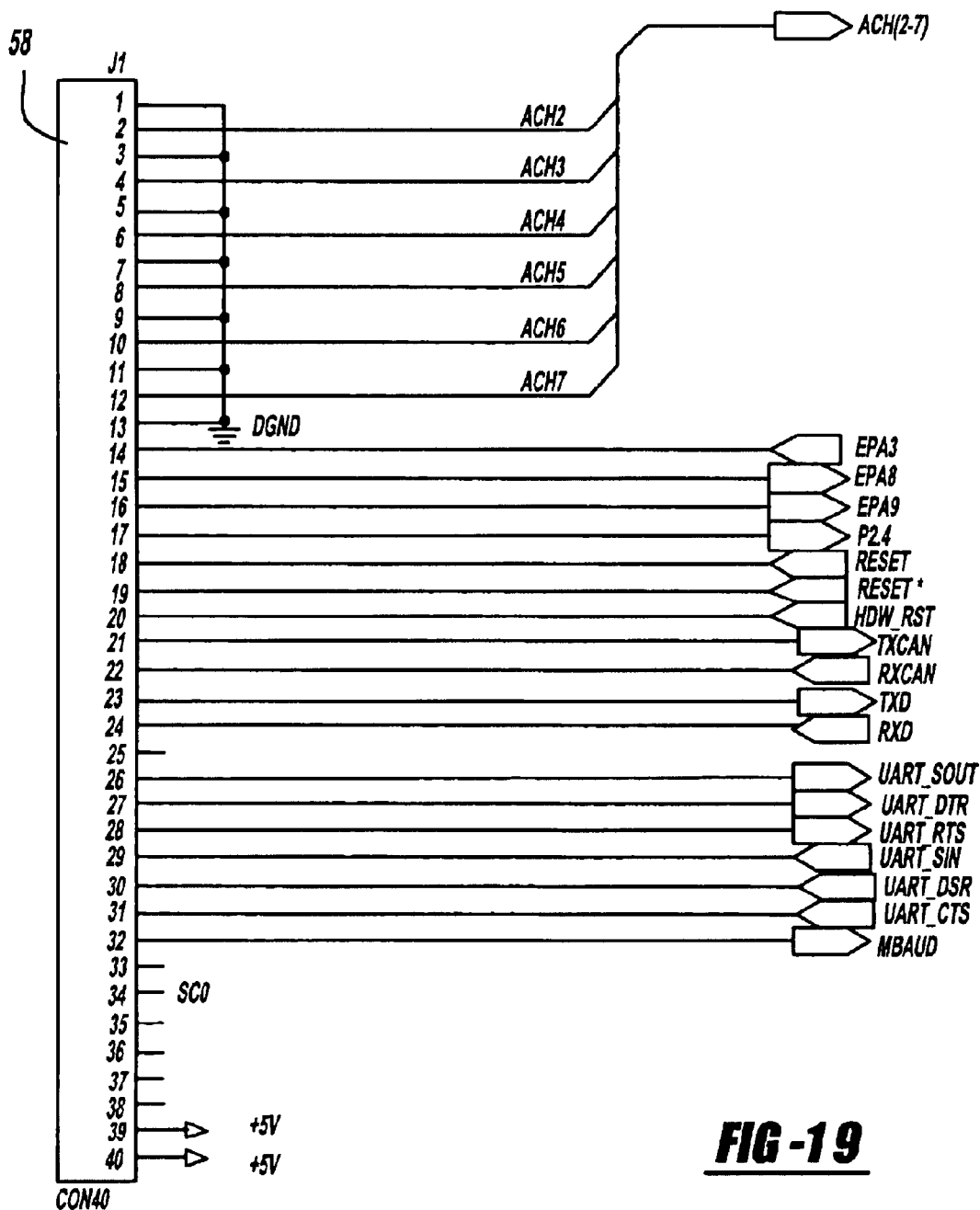
FIG. 19 illustrates I/O Interface Connector.

The circuits of the improved protocol adapter 10' are thereshown in FIGS. 18–32. The DPA I/O Board 44 is shown in FIG. 18 with the RS232 transceiver 46, the power supply regulator 48, the analog input buffers 50, the CAN Transceiver 52, the serial port transceiver 54 and LED's 56. The I/O Interface Connector 58 shown in FIG. 19.

Figure 20:
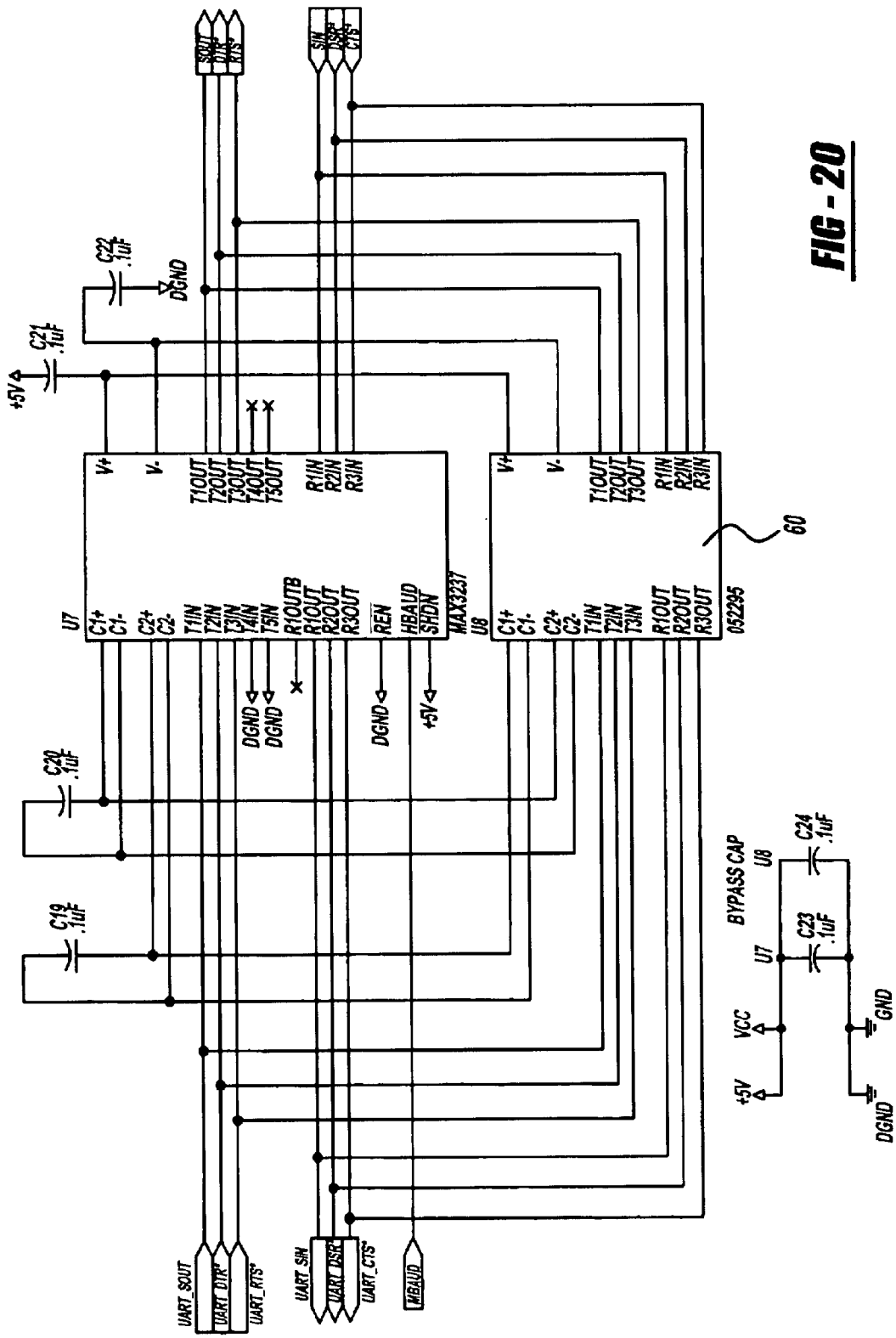
FIG. 20 illustrates RS-232 Transceivers.
Figure 22:
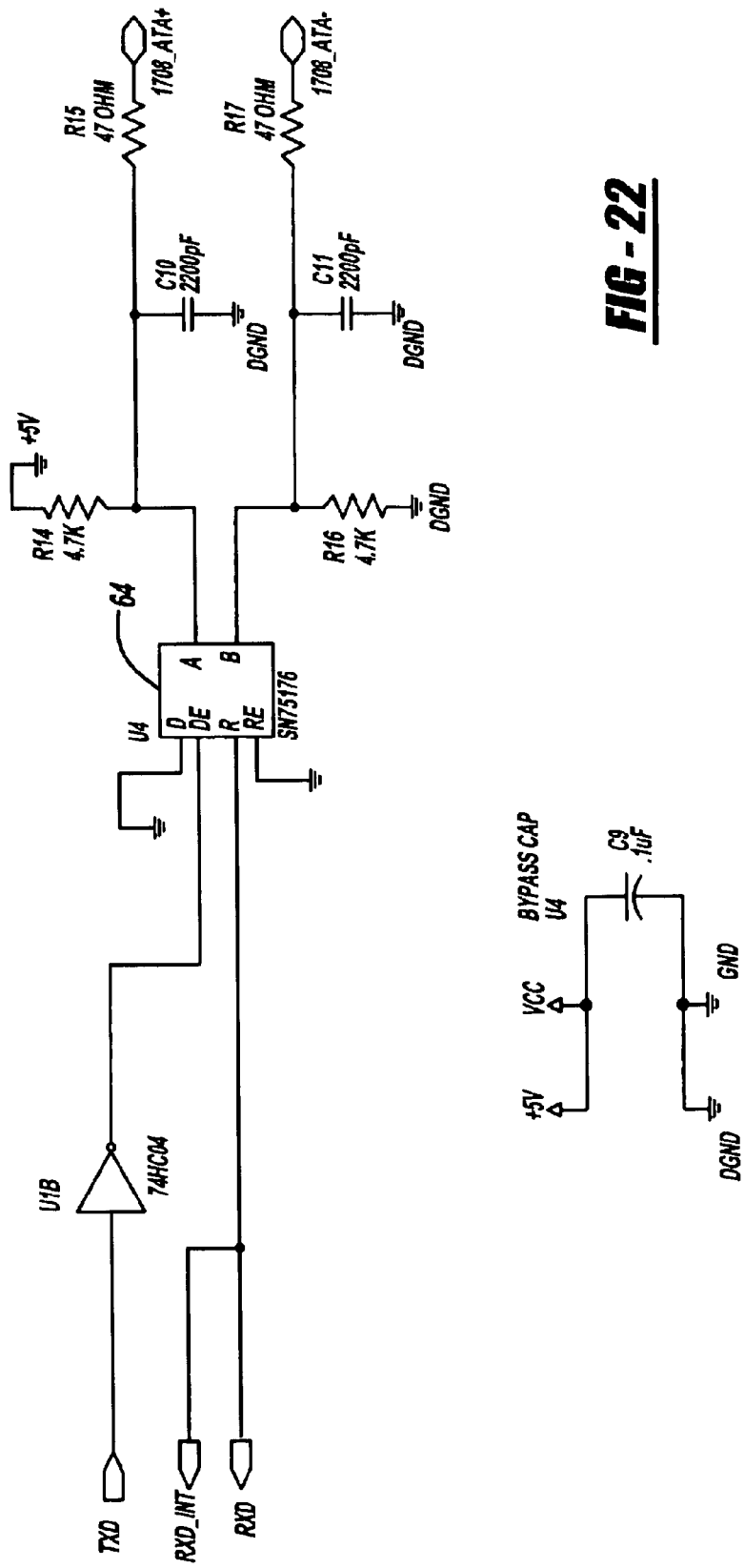
FIG. 22 illustrates I/08 Transceiver.
Figure 23:
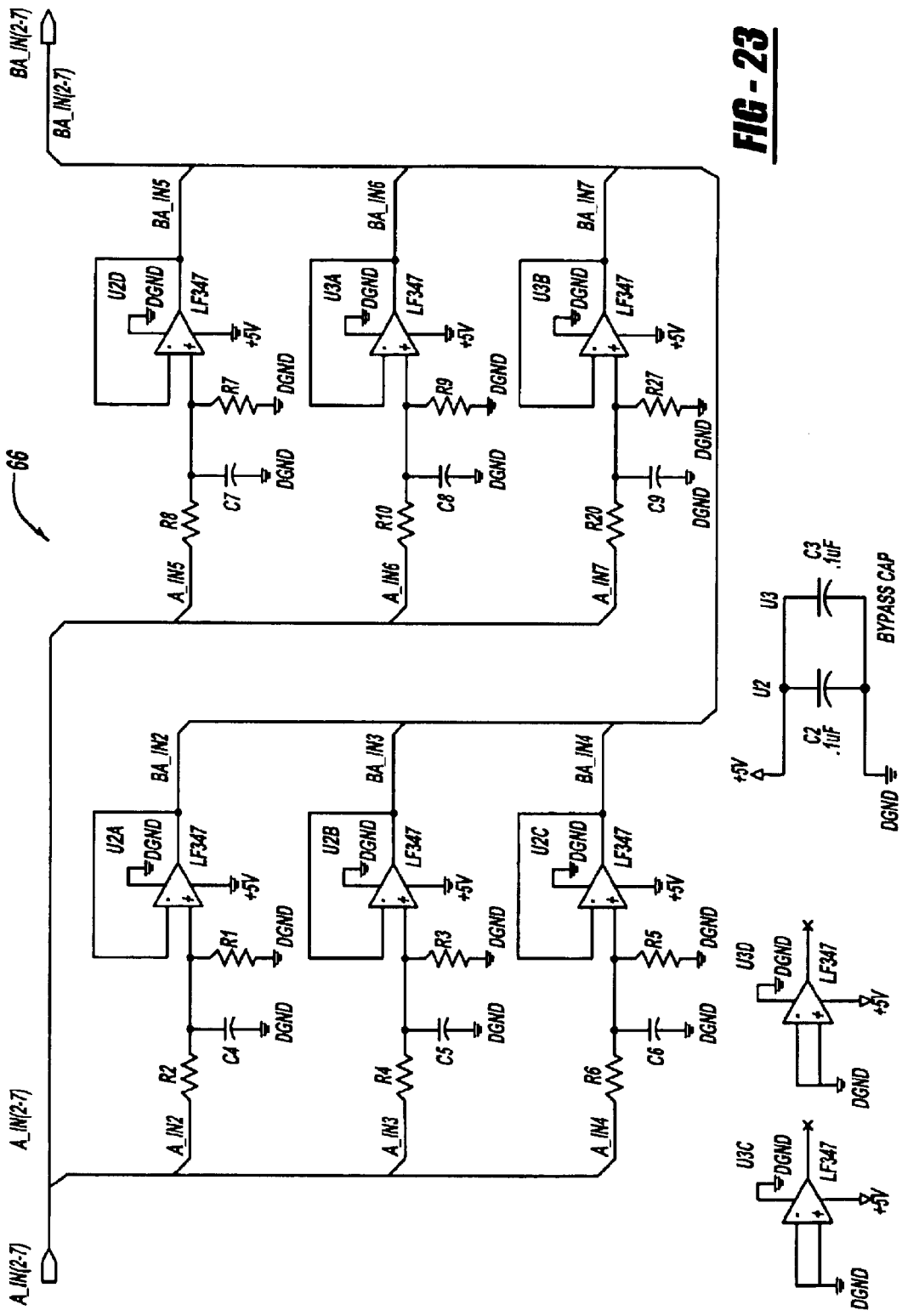
FIG. 23 illustrates Analog Input Buffers.
Figure 24:
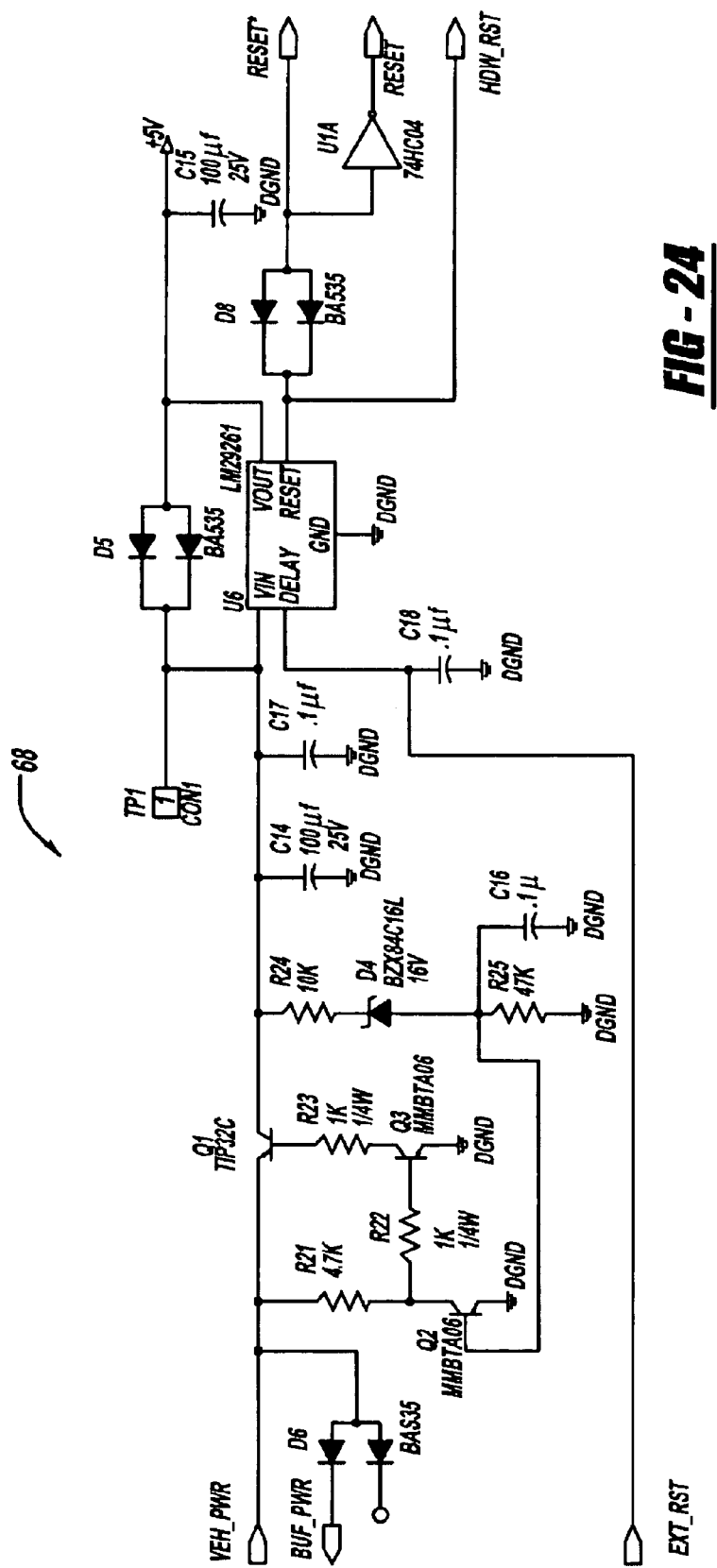
FIG. 24 illustrates Power Supply Regulator.
Figure 26:
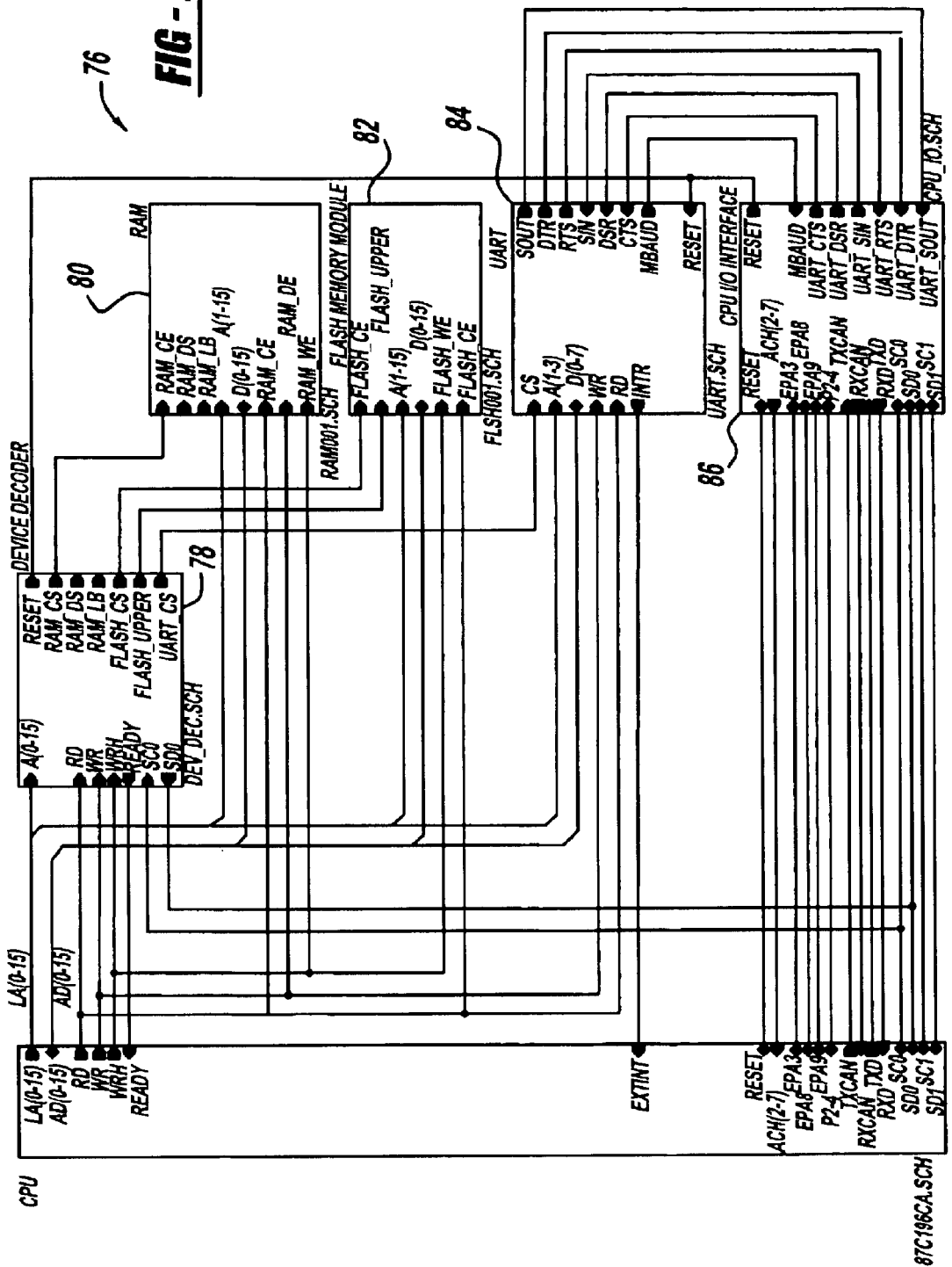
FIG. 26 illustrates DPA CPU Board.

RS-232 Transceivers 60 are shown in FIG. 20, while CAN Transceiver 62 is shown in FIG. 21, and I/08 Transceiver 64 is depicted in FIG. 22. The Analog Input Buffers 66 are depicted in FIG. 23, while the Power Supply Regulator 68 is shown in FIG. 24.

The pass through/smart mode is micro U9 70 (shown on FIG. 32) and is controlled by U5 72 on the Central Processing Unit 14 (FIG. 27) to determine if the host PC is listening to the J1708 link, or if it is wanting to have a slave session with the DPA (Diagnostic Tool). LED indicators 74, 74', 74", 74'" are depicted on FIG. 25.

Figure 27:
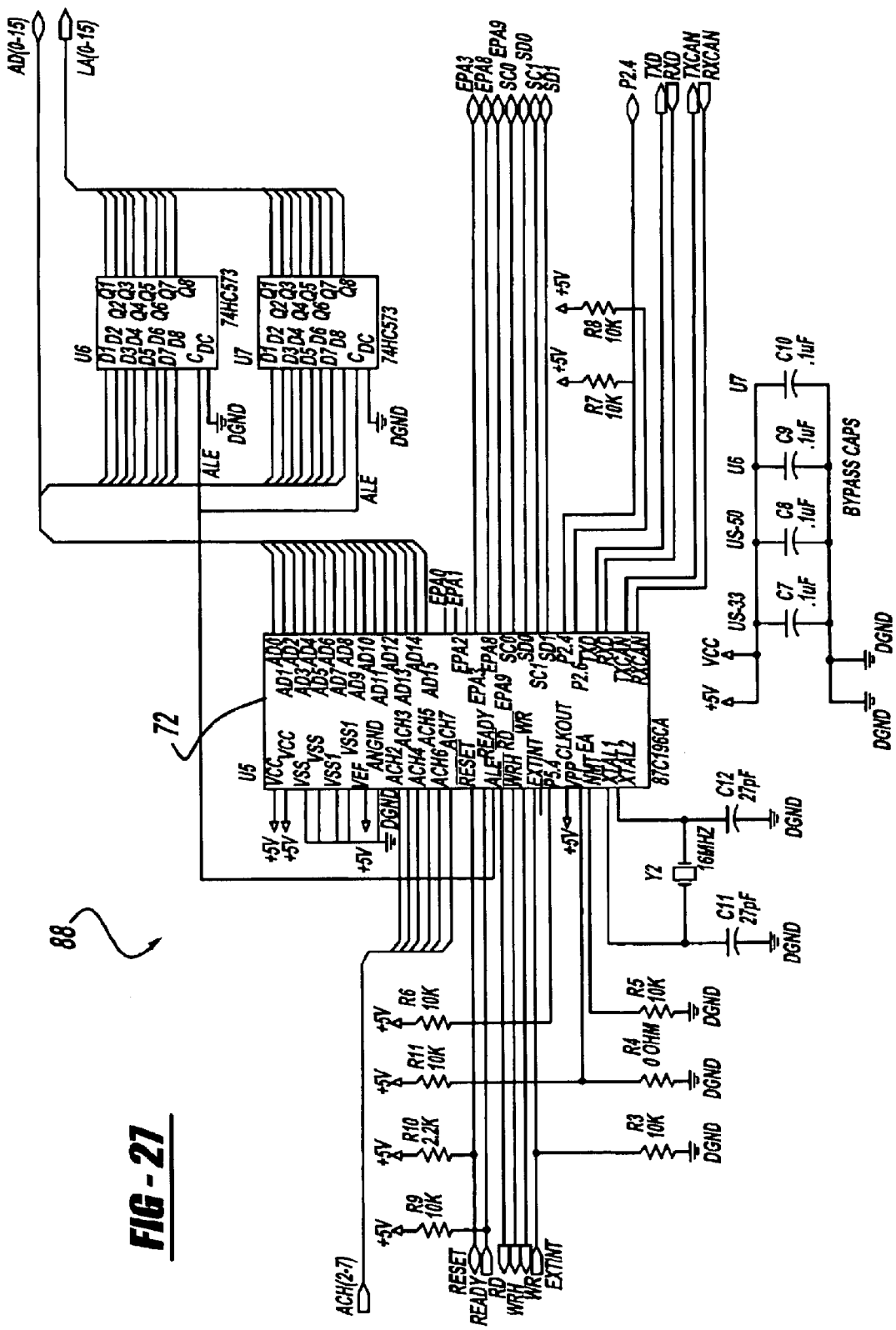
FIG. 27 illustrates Central Processing Unit.
Figure 28:
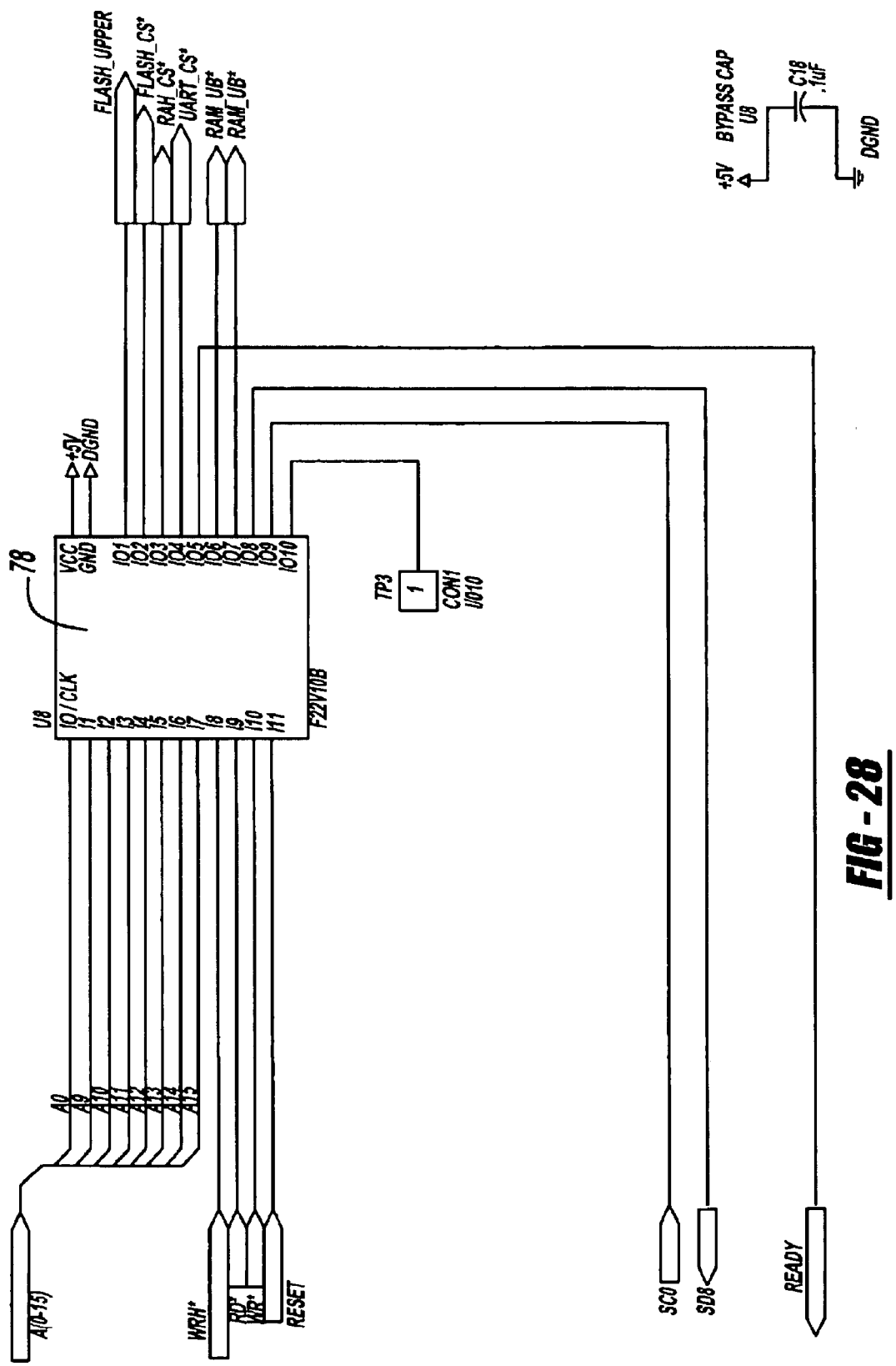
FIG. 28 illustrates Device Decoder.
Figure 29:
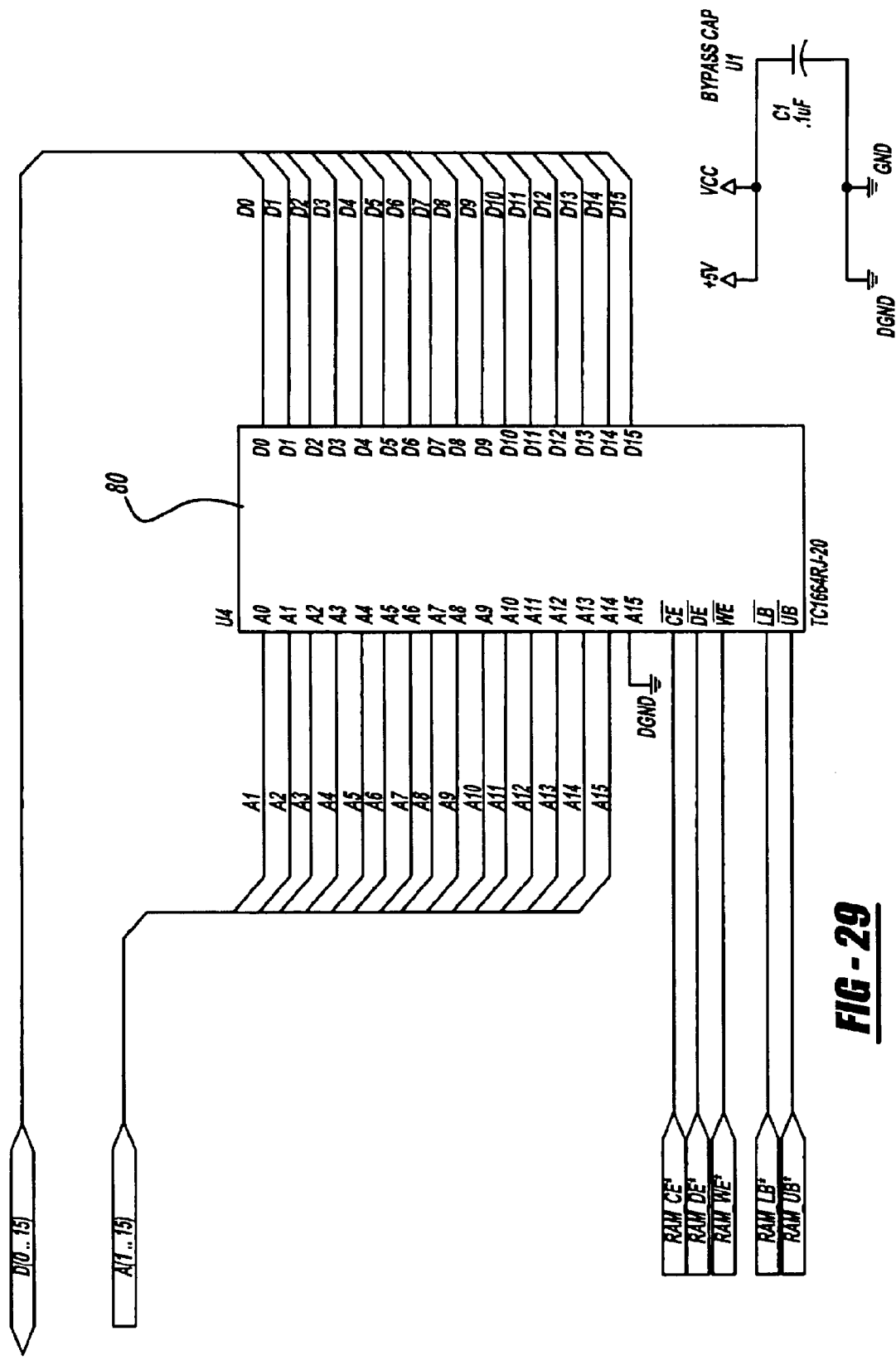
FIG. 29 illustrates Static Ram Module.
Figure 30:
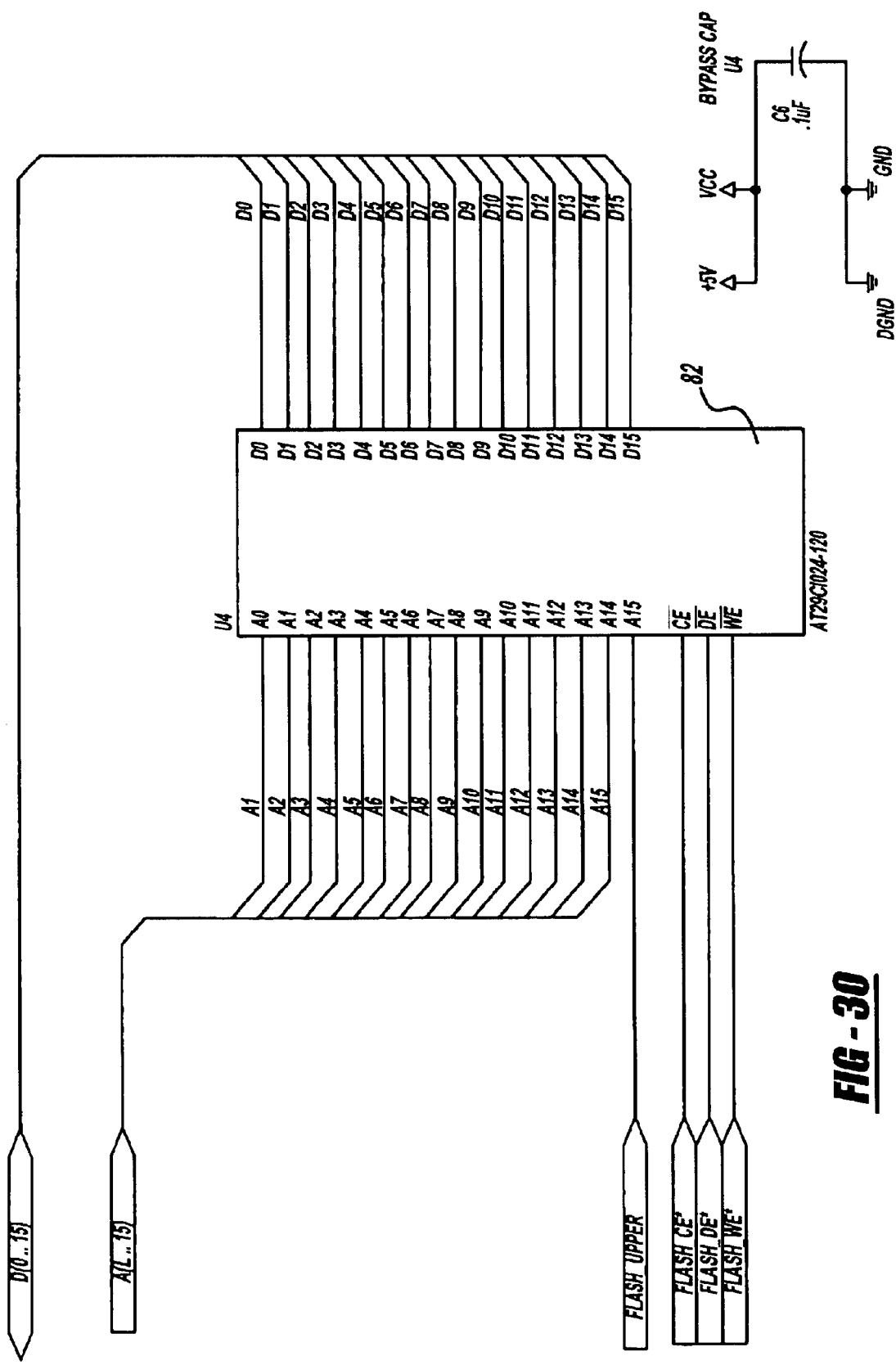
FIG. 30 illustrates Flash Memory Module.
Figure 31:
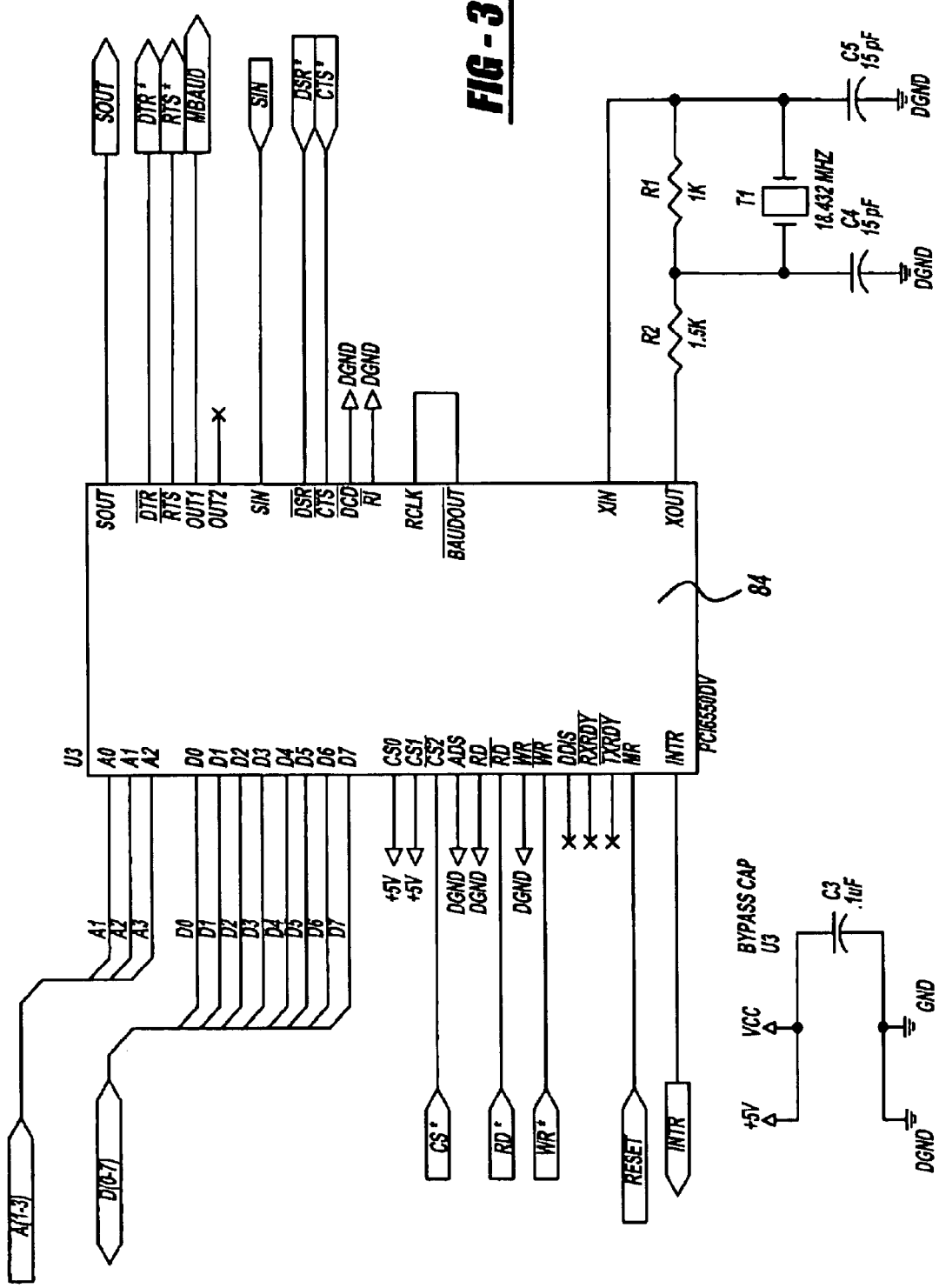
FIG. 31 illustrates UART.
Figure 32:
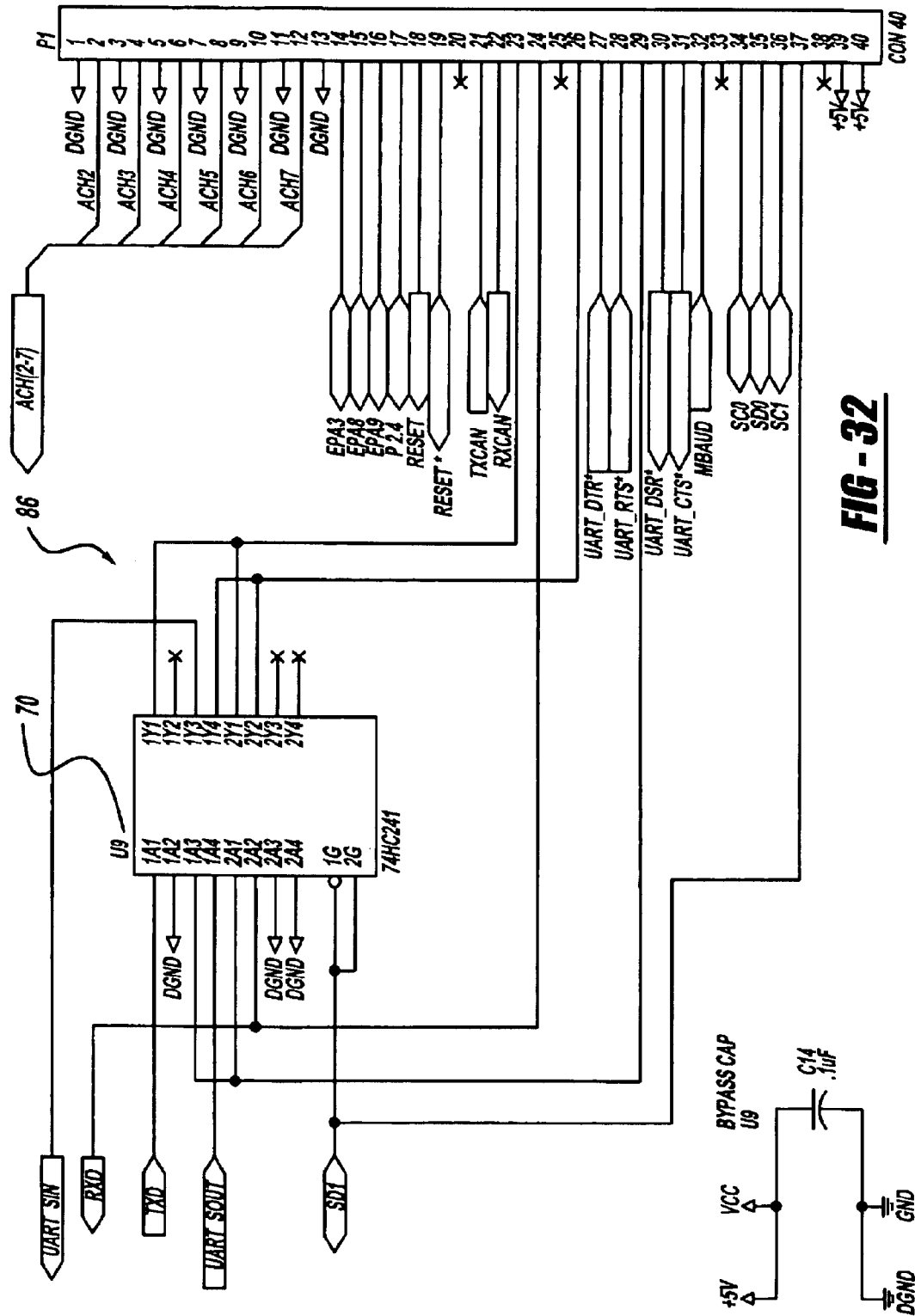
FIG. 32 illustrates CPU I/O Interface Connector.

The DPA CPU Board 76 (FIG. 26) employs a device decoder 78, a Static Ram Module 80, a flash memory module 82, a UART 84 and a CPU I/O interface 86. The device decoder 78 is depicted in FIG. 28, the Static Ram Module 80 is shown in FIG. 29, while the flash memory module 82 is shown in FIG. 30. The UART 84 is depicted in FIG. 31. The CPU I/O Interface Connector 86 is depicted in FIG. 32 and shows the U9 micro 70. The Central Processing Unit 88 is shown in FIG. 27.

The U5 micro 72 (FIG. 27) at power up will flash LED's D2, D3, and D3 74, 74', 74", 74'" (FIG. 25) to allow the operator to know what version of software is running inside the protocol adapter or diagnostic tool (DPA).

Having described our invention, many modifications thereto will become apparent to those skilled in the art to which it pertains without deviation from the spirit of the invention as defined in the appended claims.

What is claimed is:

1. A protocol adapter comprising adapter circuitry for transferring diagnostic signals between networks within a vehicle and a programmable controller, said adapter circuitry transferring the signals for different versions of software, said adapter circuitry including pass-through mode circuitry, said pass-through mode circuitry including a voltage translator for translating the voltage of the diagnostic signals, said pass-through mode circuitry causing the protocol adapter to emulate a predecessor protocol adapter to pass the diagnostic signals using obsolete software.

2. The protocol adaptor according to claim 1 wherein the adaptor couples circuitry and programs wirelessly.

* * * * *